Dec. 3, 1940.    W. F. RIDGWAY    2,224,108
MACHINE TOOL
Filed April 15, 1939    7 Sheets-Sheet 1

INVENTOR
William F. Ridgway
By Parker, Carlson, Pitzner & Hubbard
ATTORNEYS

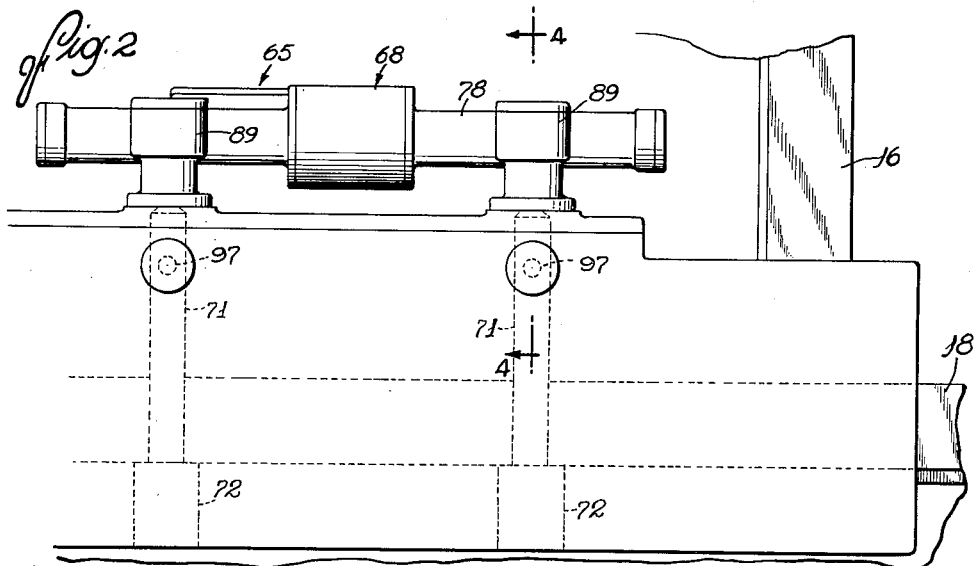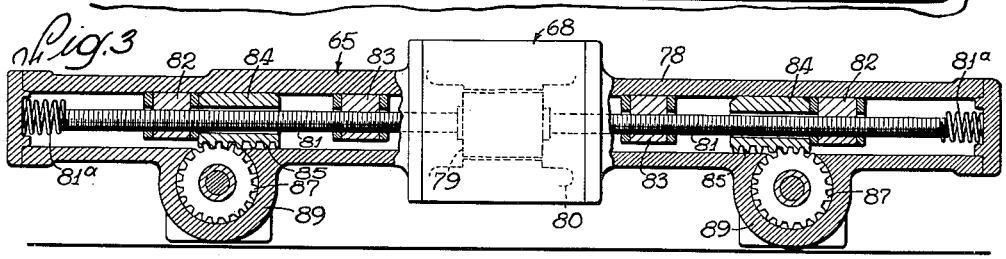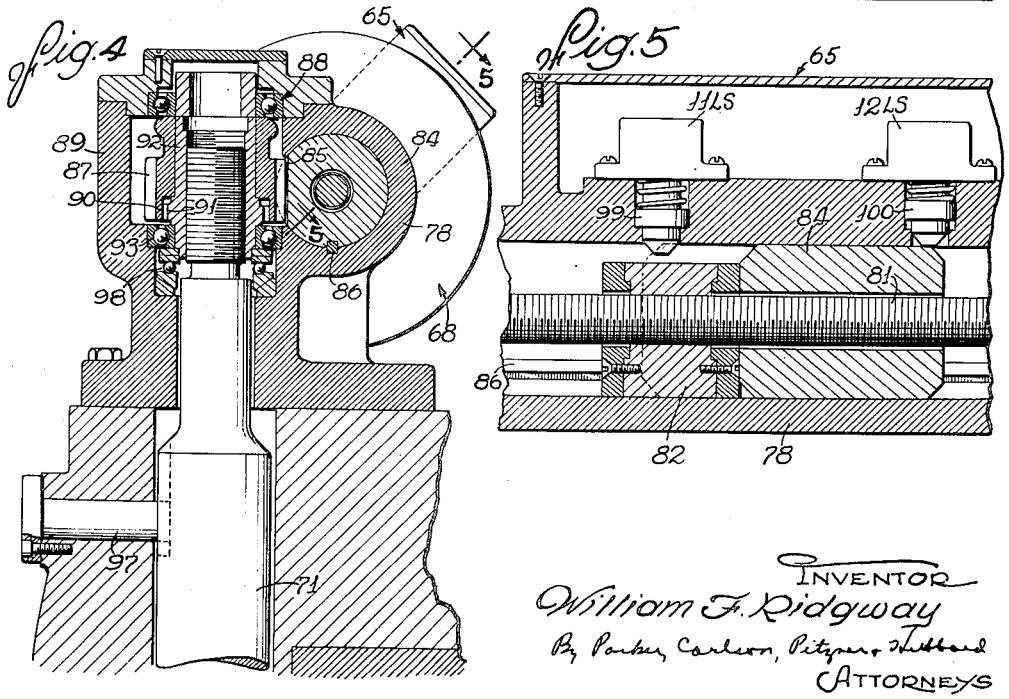

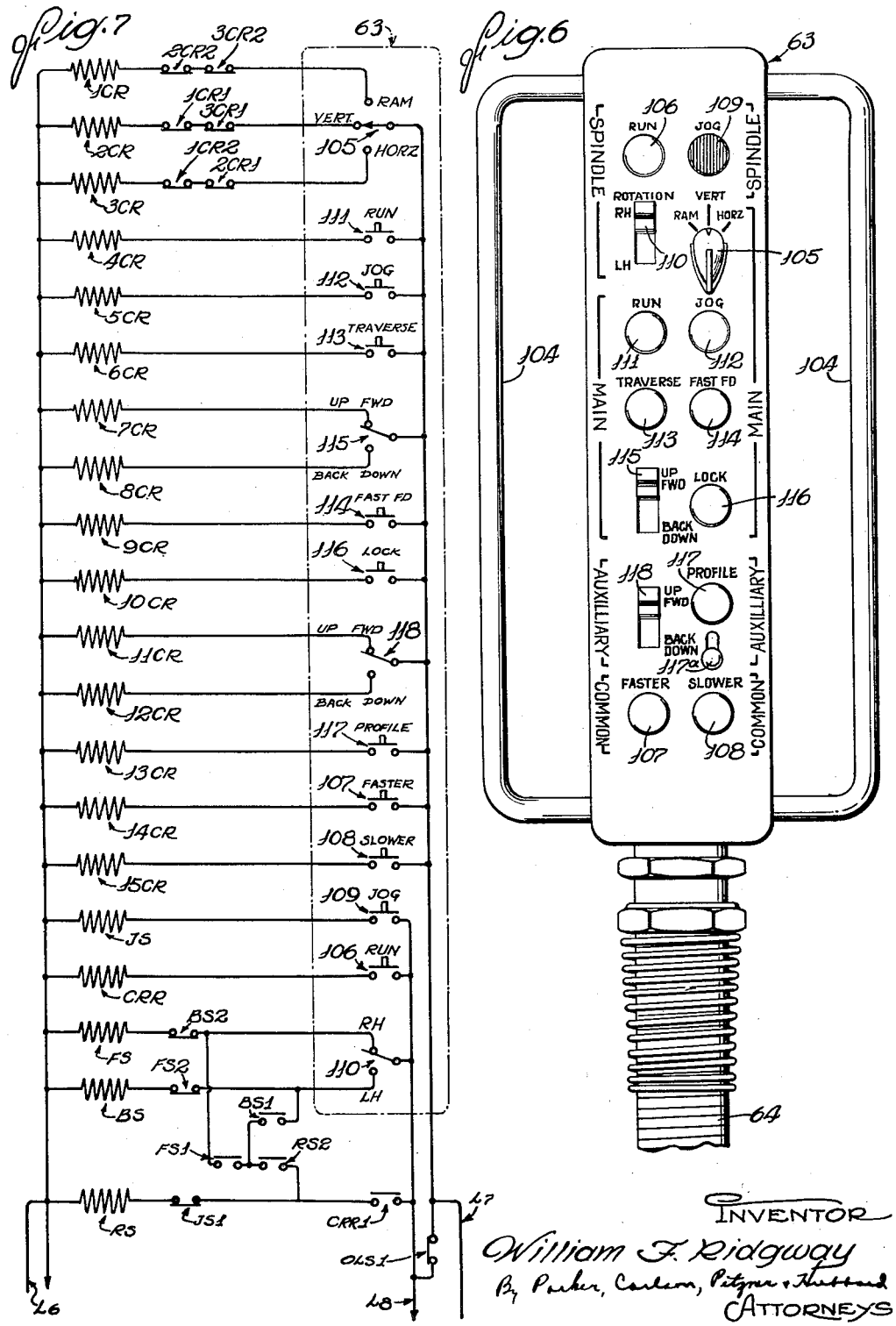

Fig. 8

Dec. 3, 1940.      W. F. RIDGWAY         2,224,108
MACHINE TOOL
Filed April 15, 1939        7 Sheets-Sheet 5
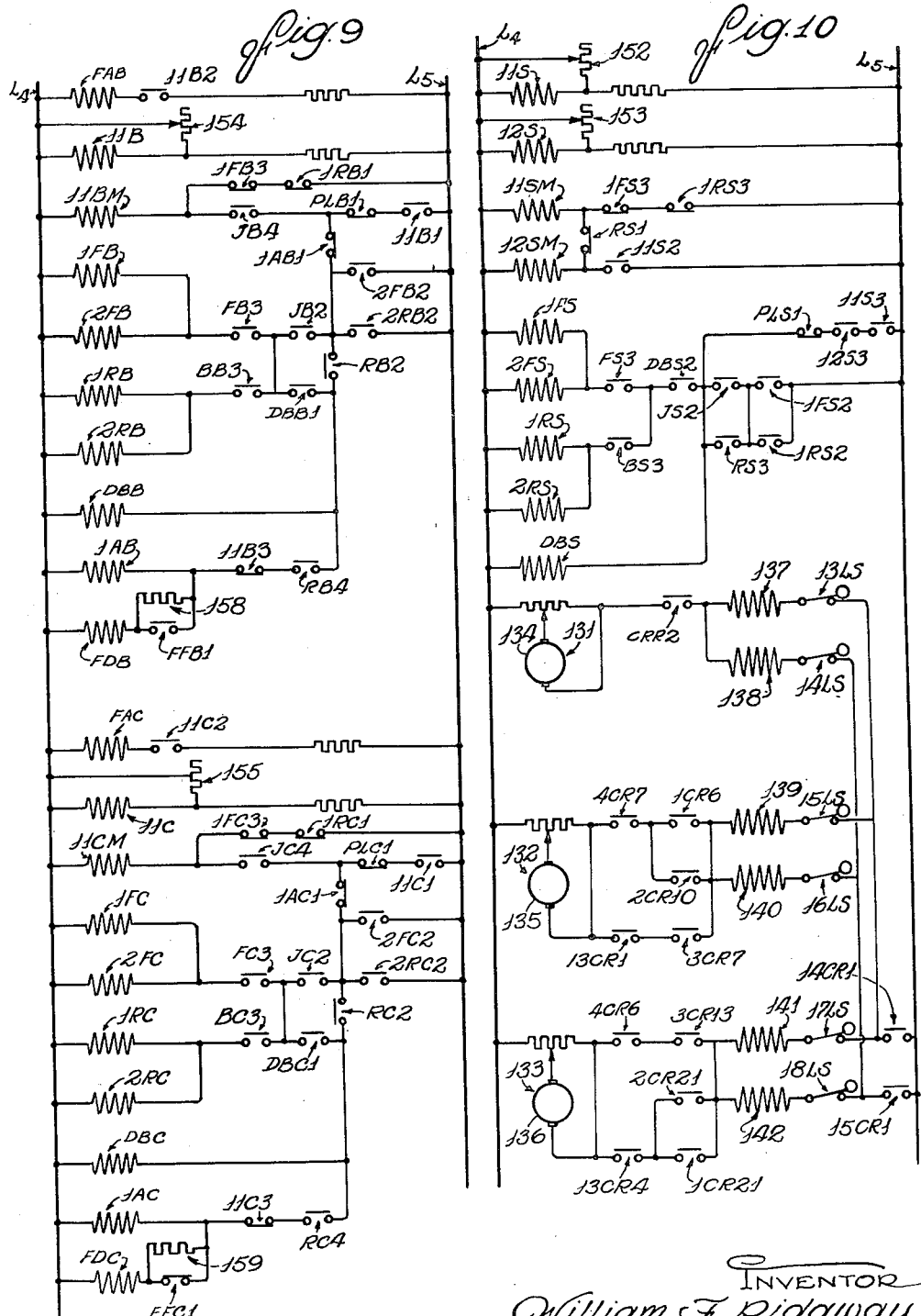

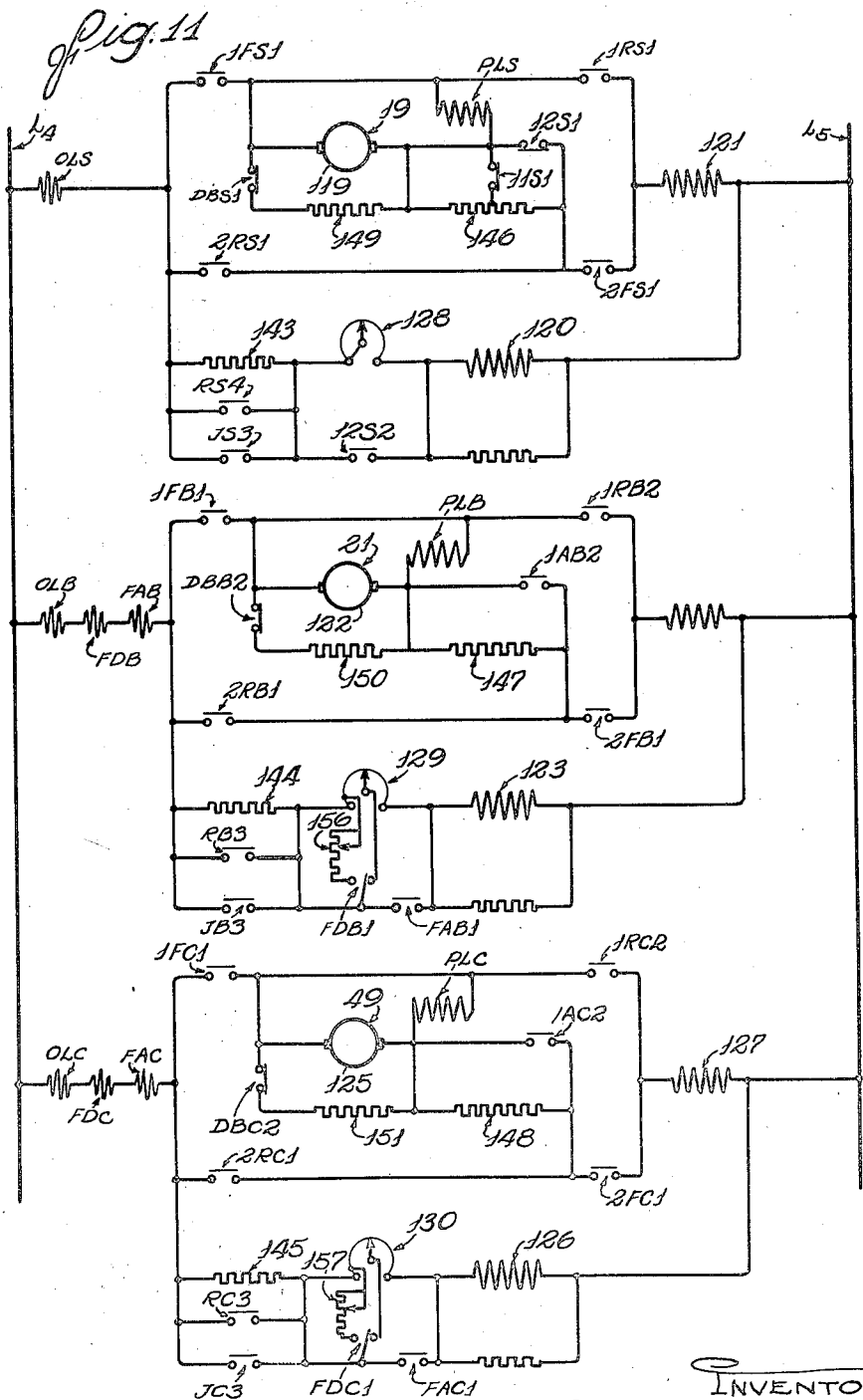

Dec. 3, 1940.   W. F. RIDGWAY   2,224,108
MACHINE TOOL
Filed April 15, 1939   7 Sheets-Sheet 7

INVENTOR
William F. Ridgway
By Parker, Carlson, Pitzner & Hubbard
ATTORNEYS

Patented Dec. 3, 1940

2,224,108

UNITED STATES PATENT OFFICE 2,224,108

MACHINE TOOL

William F. Ridgway, Rockford, Ill., assignor to The Ingersoll Milling Machine Company, Rockford, Ill., a corporation of Illinois Application April 15, 1939, Serial No. 268,071

26 Claims. (Cl. 90—16)

The present invention relates to machine tools and particularly to the control of power drives therefor.

The general object is to reduce the number of manual control devices that are required for full and effectual control of the many different functions capable of being performed by a multiple drive machine tool.

A more specific object of the invention is to provide a machine tool embodying a plurality of drive mechanisms and a novel means for selectively placing different ones of the mechanisms in control of a set of manually operable control devices.

A further object is to provide a manual set of control devices for effecting complete control of a selected machine tool element and an auxiliary set of control devices adapted to effect partial control of a different one of the machine tool elements.

Still another object is to utilize a common selector mechanism for associating the main and auxiliary controls with different machine elements.

Another object is to provide a novel arrangement of control devices which enables the motion of a machine tool element to be arrested by a device which normally controls a different function.

A further object is to provide a machine tool having a plurality of movable elements adapted to be locked or clamped against accidental displacement together with a novel control arrangement for selectively governing the application and release of the different clamps.

Still another object is to provide for application of one of the clamps by one control device and release of such clamp by an independently operable device which initiates movement of the clamp element and thereafter initiates movement of the clamped element, such movement being initiated immediately in the event that the clamp is released when the second control device is actuated.

The invention also resides in the novel manner of grouping the manual control devices and in selectively associating the same with different machine elements.

Further objects and advantages of the invention will become apparent as the following description proceeds taken in connection with the accompanying drawings, in which Figure 1 is a fragmentary end elevation of a machine tool embodying the invention.

Fig. 2 is a front elevation of one of the machine element clamping mechanisms included in the machine tool of Fig. 1.

Fig. 3 is a view, partially in longitudinal vertical section, of a portion of the clamping mechanism of Fig. 2.

Fig. 4 is a transverse vertical sectional view along the line 4—4 in Fig. 2.

Fig. 5 is a detailed sectional view along the line 5—5 in Fig. 4.

Fig. 6 is a front elevation of the control pendant for the machine tool of Fig. 1.

Figs. 7 and 8 are wiring diagrams of the low voltage control circuits.

Fig. 9 is a wiring diagram of the intermediate or secondary control circuits for the feed motors.

Fig. 10 is a wiring diagram of the rheostat adjusting motor control circuits.

Fig. 11 is a wiring diagram of spindle and feed motor energizing circuits.

For purposes of illustration of its various novel features, the invention has been shown herein as embodied in a horizontal-spindle traveling-column open side milling machine, but it will be understood that the invention is also applicable to a wide variety of other types of machine tools. Accordingly, there is no intention to limit the invention to the particular embodiment disclosed, but, on the other hand, the appended claims are intended to cover all modifications and alternative constructions falling within the spirit and scope of the invention.

GENERAL MACHINE STRUCTURE

Figure 1:
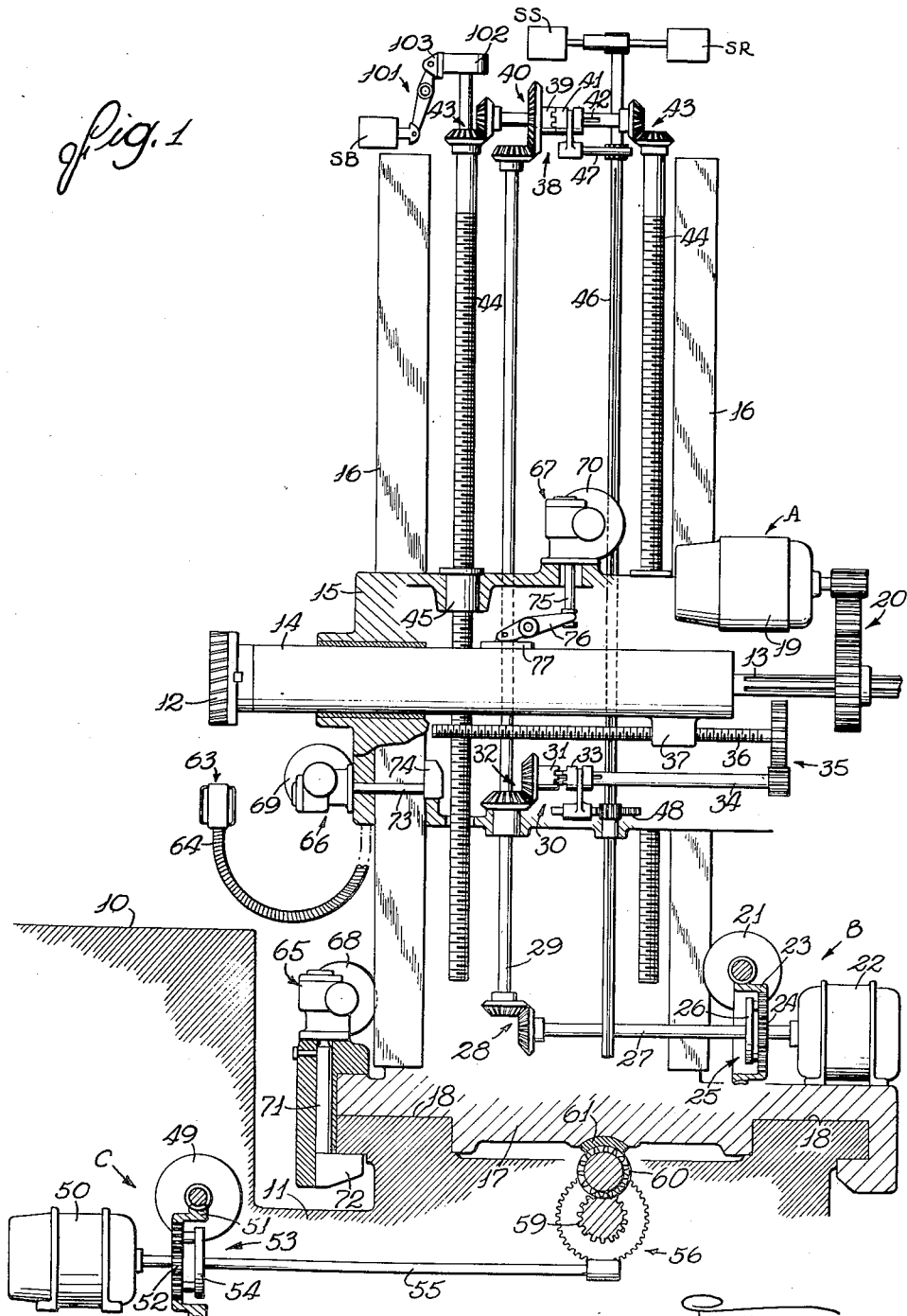

The milling machine selected for purposes of illustrating the invention is typical of those machine tools in which the cutter and the work piece may be fed relative to each other in opposite directions along a plurality, three in this instance, of paths each extending at right angles to each other or, by a combination of movements along two of these paths, may be fed along a resultant angular path. The machine, the major elements of which are shown in Fig. 1, comprises an elongated horizontal work table 10 stationarily mounted on a suitable bed 11. Overhanging the work table 10 is a rotatable milling cutter or metal removing tool 12 carried by a spindle 13, which is journaled within a ram 14 supported by and shiftable axially relative to a saddle 15.

Vertical adjustment of the cutter 12 is accomplished by traversing the saddle along vertical ways 16 fashioned on a column or housing 17. Similarly, movement of the cutter 12 longitudinally of the table 10 is accomplished by traversing the housing 17 along horizontal ways 18 on the machine bed 11.

Rotation of the cutter and feeding or rapid traversing thereof in opposite directions in the three dimensions is effected by three main power driven mechanisms or power packs, designated generally by the letters A, B, and C, and included in the illustrative machine. The power pack A includes a single reversible variable-speed electric motor 19 adapted to rotate the tool spindle 13. This motor is connected to the spindle through suitable gearing 20 with the final driven gear splined on the spindle 13 to permit axial movement of the latter.

The second or B power pack is adapted to be connected alternatively to one or the other of two machine tool elements, shown herein as the saddle 15 and the ram 14. Accordingly, this single power pack can be used at will either to raise and lower the saddle 15 or to project and retract the ram 14. The power pack itself includes a feed motor 21 and a rapid traverse motor 22 connected respectively to terminal elements 23 and 24 of a differential gearing 25. The intermediate or driven element 26 of this differential gearing drives a horizontal power take-off shaft 27 which is in turn connected through bevel gears 28 with a vertical shaft 29. The power pack B and the shafts 27 and 29 are all mounted on the transversible column 17.

To connect the power pack B with the ram 14, a clutch 30 is provided having a driving member 31 connected by bevel gears 32 with the shaft 29 and an axially shiftable driven member 33 splined on a shaft 34. This shaft 34 is connected through gears 35 with a screw 36 threaded within a traveling nut 37 fixed on the ram 14. Consequently, when the clutch 30 is engaged, the power pack B rotates the lead screw 36 and projects or retracts the ram 14. In a similar manner, the power pack B is also connectible with the saddle 15 through a second, and alternatively closable clutch 38. This clutch 38 includes a driving member 39 connected to the shaft 29 through bevel gears 40 and an axially shiftable driven member 41 splined on a shaft 42. The shaft 42 is in turn connected through two sets of bevel gears 43 with a pair of vertical lead screws 44 threaded within traveling nuts 45 fixed on the saddle 15. Accordingly, upon rotation of the lead screws 44, the saddle 15 is traversed up or down along the vertical ways 16 on the housing 17.

Alternative engagement of one or the other of the clutches 30 and 38 is accomplished by means of a rockshaft 46. This is connected to the axially shiftable driven member 41 of the clutch 48 by rocker arm 47 fixed on the rockshaft. Similarly, the rockshaft 46 is also connected by a rocker arm 48 splined on the lower portion of the shaft with the axially shiftable driven member 33 of the other clutch 30. The rockshaft 46 is oscillated in a clockwise direction (as viewed from its upper end) by a solenoid SS to engage the clutch 38 and thereby connect the power pack B with the saddle 15. Similarly, the rockshaft 46 is oscillated in the opposite direction by a solenoid SR to disconnect the clutch 38 and engage the other clutch 30 so that the power pack B is connected to the ram 14.

Figure 13:
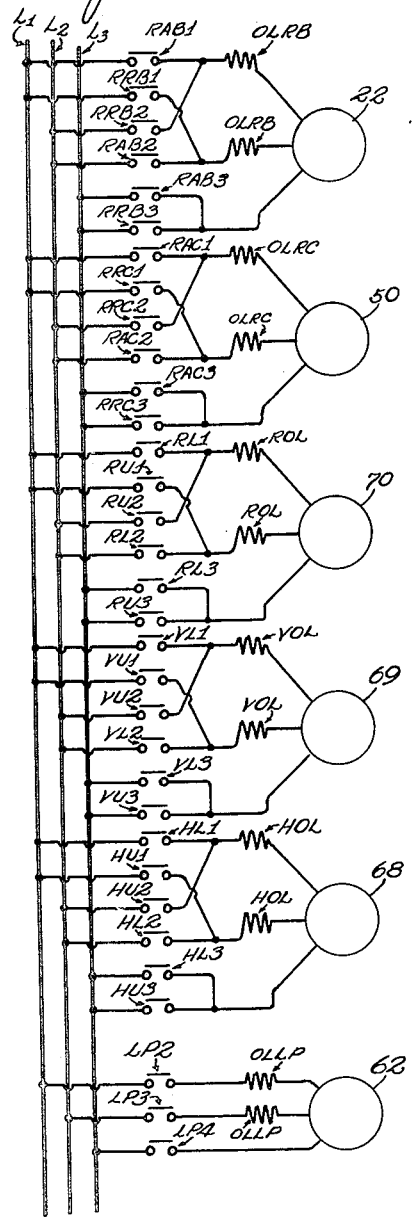
Fig. 13 is a wiring diagram of the energizing circuits for rapid traverse, clamp and pump motors.

The third or C power pack is similar to the B power pack in that it also includes a feed motor 50 connected to 49 and a rapid traverse motor 50 connected to respective terminal elements 51 and 52 of a differential gearing 53. In this case, however, the intermediate or driven element 54 of the planetary gearing operates through a shaft 55 and a suitable gearing 56. This mechanism meshes with a partial nut 61 fixed to the under side of the column 17. Lubricant for the gearing is supplied from a suitable pump (not shown) driven by a pump motor 62 (Fig. 13). In each of the B and C power packs, a brake (not shown) is utilized for holding the rapid traverse motor against rotation when idle, the brake being automatically released whenever the associated motor is energized.

MACHINE ELEMENT HOLDING DEVICES

Mechanisms 65, 66 and 67 are provided by which the column 17, the saddle 15, or the ram 14 (Fig. 1) may be clamped to or locked releasably in their supporting ways so as to avoid displacement, due to vibration or the like, of one or more of these elements during movement of another. Each of these mechanisms includes an electric torque motor designated respectively as 68, 69, and 70. In the case of the column clamp 65, the motor 68 shifts axially movable plungers 71 to move the clamping jaws 72 into and out of clamping engagement with the undersides of the ways 18. Similarly, in the saddle clamp 66, the motor 69 actuates plungers 73 to move jaws 74 into and out of clamping engagement with the inner side of the ways 16 while in the ram clamp 67, the motor 70 actuates a plunger 75 and a lever 76 and shifts a shoe 77 on the lever into and out of clamping engagement with the ram periphery.

The various clamps are all substantially identical in construction and accordingly, a detailed description of the column clamp 65 will suffice for all. The motor 68 (see Fig. 2) is mounted in the center of an elongated tubular housing 78. It may conveniently be energized with three phase alternating current and includes an armature 79 (Fig. 3) and a stator 80 which forms the central portion of the housing 78. Projecting from each end of the rotor 79 are threaded shafts 81 having right and left hand screw threads thereon and which are journaled for rotation within the housing 78. Arranged in spaced relation, and threaded on each of the shafts 81, is a pair of blocks 82 and 83 held against rotation within the housing 78 so that they are traversed along the shafts 81 upon the rotation of the latter and serve to actuate the clamping plungers 71 in the manner described below.

To form a lost motion connection between the spaced blocks 82—83 on the shafts 81 and the plungers 71, sleeves 84 are slidably mounted within the housing 78 between each pair of the blocks. These sleeves are shifted axially inwardly to clamp the jaws 72 and outwardly to unclamp the same. The blocks 82 are arranged in spaced relation to the ends of the sleeves 84 to provide a lost motion connection therebetween, however, so that the motor 68 will have an opportunity to accelerate before one or the other of the blocks 82—83 contacts the sleeves 84. When the blocks 82—83 do contact the sleeves 84, they strike them with a sharp hammer-like blow so that full actuation of the clamps is positively assured. Helical springs 81ᵃ form yieldable stops for the blocks 82 engageable with them upon the completion of the unclamping operation.

The sleeves 84 are held against rotation by keys 86 (Fig. 4) and are connected to the plungers 71 by the rack teeth 85 (Fig. 3), these sleeves meshing with gears 87 (Figs. 3 and 4). Each of the gears encircles the upper end of the associated plunger 71 and is journaled by suitable ball bearings 88 (Fig. 4) within a cylindrical housing 89. The gears 87 are not, however, fast on the plungers 71 but are connected thereto by loose spline couplings formed in each case by internal gear teeth 90 formed in a bore in the lower end of the gear 87 and meshing with external gear teeth 91 on a sleeve 92 located within the gear 87. This sleeve is in turn journaled in ball bearings 93 within the housing 89 and is threaded on the upper end of the plungers 71. These plungers are held against rotation by keys 94 so that when the sleeve 92 is rotated by the gear 87 meshing with the rack sleeve 84, the sleeve acts as a traveling nut and shifts the plungers 71 axially. In the particular arrangement shown, the blocks 82 drive the rack sleeves 84 inward in a direction to move the plungers 71 upward into clamping position and similarly, the blocks 83 drive the rack sleeves 84 in an opposite direction to shift the plunger 71 downward into unclamping position. It should be noted that the sleeves or traveling nuts 92 rest with their lower ends on ball bearing type thrust bearings 98 so that all thrust incident to the clamping operation is taken up at this bearing.

To deenergize the clamping motor 68 at the termination of the clamping and unclamping operations, limit switches 12LS and 11LS (Fig. 5) are urged toward open position by spring actuated plungers 99 and 100. The switch 12LS also embodies a second set of interlock contacts 12LSA (Fig. 8) arranged to close only when contacts 12LS open and thereby prevent operation of the C power pack to drive the housing 17 except when the latter is unclamped. The plunger 100 is depressed by the rack sleeve 84 when the latter is in its clamping position and similarly, the plunger 99 is depressed by the opposite end of the latch sleeve when the latter is in its unclamping position. It should be noted here that in the saddle and ram clamps 66 and 67 respectively, similar pairs of limit switches 9LS—10LS and 7LS—8LS are also provided (Fig. 11), and the switches 8LS and 10LS include additional interlock contacts 8LSA and 10LSA (Fig. 8) for preventing operation of the B power pack to drive the saddle or ram except when the corresponding element is unclamped.

The saddle clamping mechanism 66 is intended primarily for use during boring operations when extreme rigidity of the saddle 15 is required. When the machine tool is being used for ordinary milling operations, however, there is some possibility of the saddle 15 settling if the clamp 66 is not active, since the lead of the threads on the screws 44 is frequently rather large. To overcome this difficulty, a supplemental brake mechanism 101 (Fig. 1) is utilized for holding one of the lead screws 44 against rotation whenever the saddle 15 is stationary. This brake mechanism may be of any well known form and has been shown as including a brake drum 102 engageable by a friction shoe 103 normally urged into engaged position and actuatable into brake released position by a solenoid SB. Through the medium of the control circuits hereinafter described, the solenoid SB is automatically energized to release the brake 101 whenever the lead screw 44 is being driven to traverse the saddle 15.

MANUAL CONTROL DEVICES

Control of all three of the power packs A, B, and C to start, stop, and determine the direction of movement of the machine element actuated thereby, in this instance the cutter, is accomplished by a set of manually operable control devices, preferably in the form of switches, grouped together and carried by a panel or pendant 63 (Figs. 1 and 6) which is readily movable about the machine tool so as to permit all of the various functions to be governed selectively from a point remote from the power mechanisms. The panel 63 comprises a relatively small and elongated boxlike casing which, as shown in Figs. 6 and 7, houses the control switches and supports their exposed actuating members. The electrical connections between these switches and the power pack controllers are extended from the pendant casing through a flexible cable of such length as to enable the pendant to be moved conveniently to any desired position about the work table 10. Rigid bars 104 along the vertical sides of the pendant casing define finger openings so that the operator may both support the pendant and operate the various control devices with one hand only. The control devices are of the single or multiple switch type and have movable actuating members in the form of push buttons, levers, or the like projecting through or disposed on the face of the pendant casing.

The present invention contemplates a novel arrangement of the control devices and association thereof in a novel manner with the controllers for the power actuators so that a relatively large number of operating functions of the machine tool, performed singly or in combination, may be controlled by manipulation of a comparatively smaller number of control devices which may be operated quickly and conveniently and without danger of confusion. As a result, the machine tool may be controlled from a selected remote point rapidly, precisely, and efficiently with a substantial reduction in operating time required to machine a given work piece.

Generally stated, two factors contribute largely to this substantial reduction in the number of control switches. First, is the use of a selector or selectors to connect a group of the control switches with a selected one of the drive mechanisms rather than duplicating the group for each drive mechanism. Second, is the utilization of the individual switches to perform a plurality of different controlling functions.

To facilitate their quick location and comprehension of their function by the operator, the control devices or switches are arranged on the pendant 63 (Fig. 6) in groups indicated by the words "spindle," "main," "auxiliary," and "common along the vertical margins of the pendant face. The switches in the "spindle" group control the spindle drive motor 19. The switches in the "main" group, on the other hand, can be conditioned by a three position selector switch 105 to give a full and highly flexible control of the drive mechanism and clamping mechanism for any one of (a) the ram 14, (b) the saddle 15, or (c) the column 17. By using this single set of "main" switches to control any selected one of several drive mechanisms, duplication of switches for each drive mechanism is obviated. On the other hand, in certain machining operations such as profiling, it may be desirable to feed the cutter at an angle to one of the three normal paths of travel by operating two of the drive mechanisms simultaneously. For example, it may be necessary not only to traverse the column 17 longitudinally of the work table 10 but also to move the saddle 15 vertically with respect to the table. To permit this type of machining, a set of controls designated as the "auxiliary" group is arranged to be connected to selected ones of the drive mechanisms. In particular, the selector switch 105 can be shifted to either its "ram," "vertical," or "horizontal" positions in which it places the "main" set of switch actuating members in control of the movements of the ram 14, the saddle 15, and the housing 17 respectively. At the same time, the selector 105 automatically adapts the "auxiliary" set of switch actuating members for control of the drive mechanism for traversing the column 17 when the selector 105 is in its "ram" or "vertical" positions and adapts the "auxiliary" controls for controlling the movements of the saddle 15 when the selector is in its "horizontal" position. In other words, conditioning of the selector 105 to place a selected one of the movable machine elements under the control of the "main" control devices automatically places within the control of the "auxiliary" devices a predetermined machine element the actuation of which produces a movement at right angles to that of the machine element then under control of the "main" devices. Finally, a "common" group of switches is arranged to be connected selectively to any one of the drive mechanisms including not only those selected for control by the "main" or "auxiliary" groups but also to the spindle drive mechanisms.

Considering first the several selection functions performed by the selector switch 105, this serves, when in its respective "ram" and "vertical" positions, to energize the respective clutch actuating solenoids SR and SS (Fig. 1) to connect the B power pack to traverse the ram 14 and the saddle 15 respectively. Second, it connects the "main" group of switches to the B power pack when in its "ram" and "vertical" positions, and connects this set of switches to the C power pack when in its "horizontal" position. In other words, it places the "main" group of control switches in command of any selected one of the three movable machine tool elements, namely, the ram 14, the saddle 15, and the housing 17, and additionally, it determines which of the two elements 14 and 15 shall be connected to the B power pack since this power pack is used alternatively for one or the other. Third, the selector switch 105 connects the "auxiliary" set of control switches to a non-selected one of the drive mechanisms. As was previously noted, it connects the "auxiliary" set of controls to the C power pack for the housing 17 except when the "main" set of controls is connected to this power pack and in the latter event, the selector connects the "auxiliary" set of controls to the B power pack and also connects this latter power pack to the saddle 15. Fourth, the selector switch 105 connects a single "lock" control device 116 on the pendant 63 with any desired one of the clamps 65—67 for the column, saddle, and ram respectively. This "lock" control device is, in fact, part of the "main" group of switches, but the selector 105 can be shifted to the proper one of its three positions and the clamp mechanism operated without setting in operation the drive mechanism for the corresponding element of the machine.

Briefly stated, the functions of the switches in the several groups on the pendant 63 (Fig. 6) are as follows:

"Spindle" group

The "run" push button switch 106 starts the spindle motor 19 when the push button is even momentarily depressed. Second, when the "run" push button is held down, it connects the "faster" and "slower" push button switches 107 and 108 of the "common" group with the speed adjustment mechanism of the spindle motor 19.

The "jog" push button switch 109 stops not only the spindle motor 19 but also all of the other drive motors in the machine tool as soon as it is depressed so that it acts as an emergency stop control device for the entire machine. Additionally, if the "jog" push button 109 is held depressed, it acts as a hold-down jog switch and causes the spindle motor 19 to rotate the tool spindle 13 at a low jog speed for adjusting the angular position of the cutter 12.

The "rotation" switch 110 is of the toggle type and has a two position movable element which determines the direction of spindle rotation. Furthermore, it may be used as a spindle motor stop switch since it will stop the motor 19 whenever it is shifted from one position to the other while the motor is running, reactuation of the "run" switch 106 being required to restart the motor in the new direction.

"Main" group

The "run" push button switch 111 serves, when momentarily depressed, to start either the feed motor 21 or the feed motor 49 depending upon which of the power packs B or C is connected to the "main" group of control switches. Secondly, when the "run" switch 111 is held down, it connects the "faster" and "slower" push button switches 107 and 108 of the "common" group with the speed adjustment mechanism of one of the feed motors 21 or 49 with which the "run" switch is associated at the time.

The "jog" push button switch 112 serves, when momentarily depressed, to stop the feed motor in the particular one of the power packs B or C that may at any time be in control of the "main" group of switches. Secondly, if the "jog" switch 112 is held depressed, it acts as a hold-down jog switch and causes the associated feed motor 21 or 49 to operate at a slow jogging speed for adjusting the position of the associated machine tool element.

The "traverse" switch 113 is a hold-down switch for maintaining in operation, during the time it is held depressed, the rapid traverse motor 22 or 50 of one or the other of the power packs B and C to which the "main" set of controls is connected by the selector 105.

The "fast feed" push button switch 114 is a hold-down switch and serves, when held depressed, to connect the associated one of the feed motors 21 and 49 for traversing the associated machine tool element at a fast feed rate intermediate the rapid traverse and normal feed rates.

The "direction selector" switch 115 is of the toggle type with a two position movable element and acts to determine the direction of rotation of both the feed and rapid traverse motors in the associated one of the power packs B and C. Additionally, if the selector switch 115 is shifted from one position to the other while the associated power pack is in operation, it will stop the feed motor in the power pack which may have been running and it can only be restarted by reactuating the "run" button 111.

The "lock" push button switch 116 is operable upon a momentary actuation thereof to energize any one of the clamp motors 68—70, selected by the selector switch 105, to move the associated clamping mechanism into clamped position. It should be noted here that upon restarting of the drive mechanism for the clamped machine element, the clamping mechanism is automatically released before the drive mechanism actually starts to operate.

"Auxiliary" group

The "profile" push button switch 117 starts the feed motor of the power pack B or C to which the auxiliary set of controls is connected. Furthermore, this switch maintains such feed motor in operation only so long as the switch is held depressed and automatically stops the feed motor when the switch is released. A latch 117a is provided on the pendant adjacent the button 117 and, when shifted upwardly while the button is depressed, serves to hold down the button 117 for sustained operation of the feed motor which it controls. In addition, the "profile" switch 116 also conditions the "faster" and "slower" push buttons 107 and 108 of the "common" group to adjust the speed of the feed motor controlled by the "profile" switch when the latter is held depressed.

The "direction selector" switch 118 is of the toggle type and has a two position movable element which determines by its setting the direction of rotation of the feed motor to which the "auxiliary" set of controls is connected. Furthermore, shifting of the selector switch 118 from one of its positions to the other while the associated feed motor is in operation serves to stop the same.

"Common" group

The "faster" and "slower" push button switches 107 and 108 are alternatively available for speeding up or slowing down either of the feed motors 21 and 49 or the spindle driving motor 19. As was heretofore noted, the particular motor which they are effective to control depends upon the selection function of the "run" push buttons 106 and 111 and "profile" button 117. The speed changing operation takes place so long as one or the other of the "faster" or "slower" buttons is held down.

Of the above switches on the pendant 63, the push button switches are all spring biased to open position. The selector switches 105, 110, 115, and 118 are, on the other hand, all position-maintaining switches, that is, the movable actuating element is retained by yieldable detent action in any position to which it is shifted manually and the movements of the movable switch contacts from position to position occur with a snap action in response to shifting of the actuating element. The switches 110, 115 and 118 are of the standard toggle type. The switch 105 is also of well known construction, one form being manufactured by the Cutler Hammer Company and identified as No. 7012.

General Circuit Arrangement

Suitable supply lines are provided for the various parts of the electrical control and motor energizing systems. High voltage alternating current of, say, 220 volts is furnished by three phase supply lines $L_1$—$L_2$—$L_3$ (Fig. 13) for the rapid traverse motors 22 and 50 as well as for the clamp motors 68—70 and the lubricant pump motor 62. Single phase alternating current may be utilized from a pair of these supply lines $L_1$—$L_2$ for the rapid traverse, clamp, and pump motor contactors (Fig. 12) as well as for the clutch solenoids SS and SR and the brake solenoid SB. Since the spindle and feed motors 19, 21, and 49 are all variable speed motors, they may more conveniently be direct current motors rather than alternating current and are accordingly supplied from high voltage direct current supply lines $L_4$—$L_5$ at, say, 220 volts (Fig. 11). The rheostat adjusting motors associated with the spindle and feed motors (Fig. 10) as well as the feed motor contactors and intermediate control relays (Fig. 9) may also be conveniently energized from the same direct current supply lines $L_4$—$L_5$. To minimize the size of the manual switches and the conductor insulation required, however, the switches on the pendant 63 are preferably included in low voltage control circuits supplied, for example, with alternating current at twenty-four volts by supply lines $L_6$—$L_7$ (Fig. 7).

Figure 8:
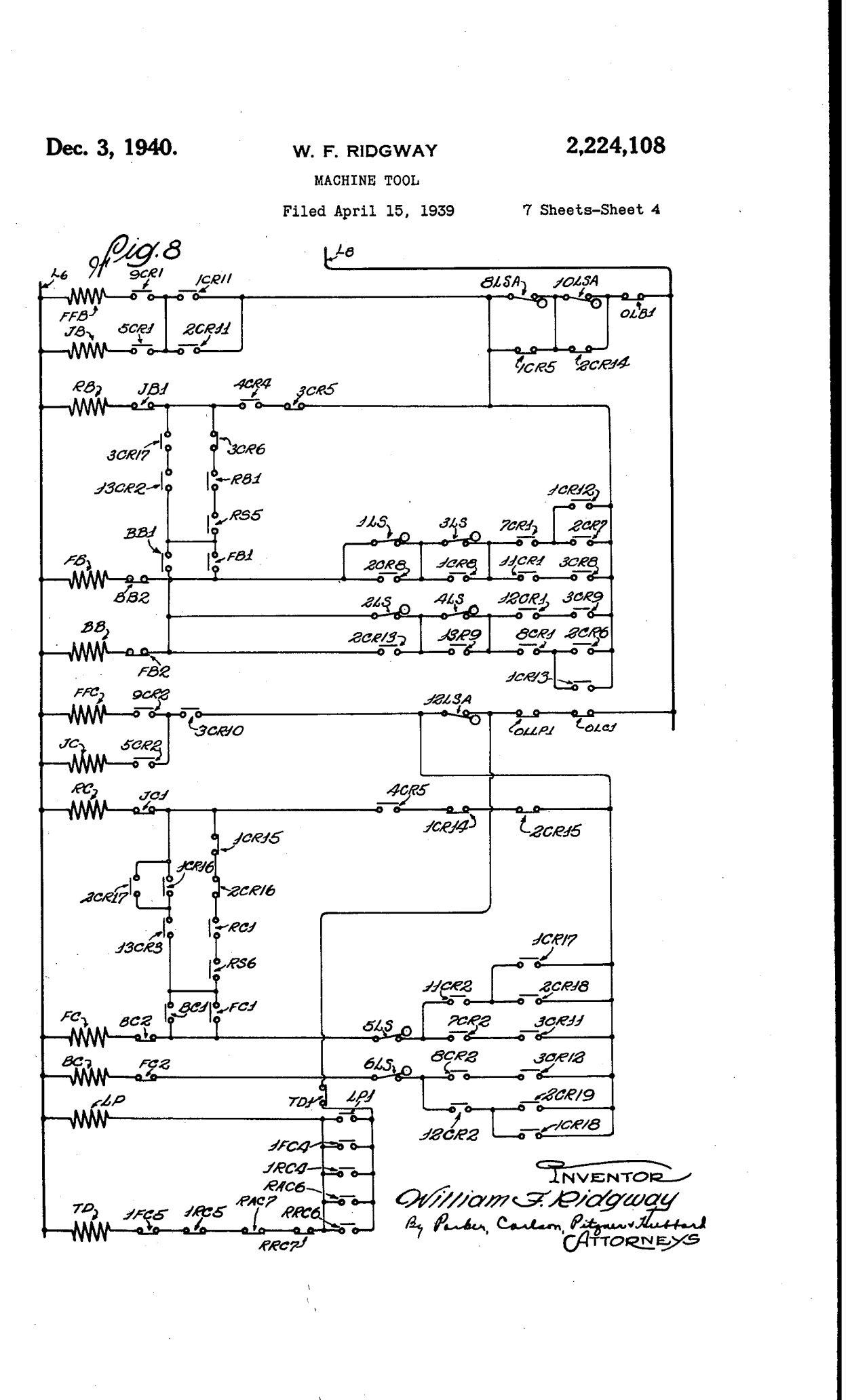

For the sake of simplicity of analysis, line-to-line wiring diagrams have been used (Figs. 7 to 13) and the networks of different voltages have been shown separately. Since the network of Fig. 8 is connected between supply lines $L_6$—$L_8$, which also appear at the bottom of Fig. 7, these two wiring diagrams in Figs. 7 and 8 may be placed end to end with Fig. 8 below to form the complete low voltage control network. Similarly, the direct current networks of Figs. 9, 10, and 11 may all be considered as a unit since all connections are between the same pair of supply lines $L_4$—$L_5$. In the same manner, the networks of Figs. 12 and 13 may be considered together since that of Fig. 12 constitutes connections between two of the three supply lines included in the three phase system of Fig. 13.

The feed motors 21 and 49 for the B and C power packs, as well as the spindle motor 19 of the A power rack, are all reversible adjustable speed motors and have been shown (Fig. 11) as being compound direct current motors. In particular, the spindle motor 19 has an armature 119, a shunt field 120, and a series field 121. Similarly, the feed motors 21 and 49 have respectively armatures 122 and 125, shunt fields 123 and 126, and series fields 124 and 127.

Speed variations for the feed motors 21 and 49 as well as the spindle motor 19 are accomplished by varying their shunt field excitations through the medium of rheostats 128, 129, and 130 respectively (Fig. 11). The setting of these rheostats is in each case varied by an associated reversible rheostat adjusting motor 131, 132, and 133 respectively (Fig. 10). Each of the rheostat adjusting motors includes a respective armature 134—136 and a pair of alternatively energizable field windings 137—142 for driving the motor in correspondingly opposite directions to change the setting of the driven rheostat commensurately. In particular, when the rheostat adjusting motor fields 137, 139, and 141 are energized, the rheostats are shifted to increase the speed of the motors which they control, and conversely, when the rheostat adjusting motor fields 138, 140, and 142 are energized, the rheotats are shifted to decrease the speeds of the associated motors. The usual limit switches are provided for preventing overtravel of the rheostat adjusting motors 131—133. Thus, the motor 131 is stopped at the respective limits of its travel by opening of one or the other of the limit switches 13LS or 14LS, and the motors 132 and 133 are similarly stopped by corresponding sets of limit switches 15LS—16LS and 17LS—18LS.

To minimize the shunt field heating while the spindle and feed motors are idle, economy resistors 143—145 are inserted in series with the shunt field windings 126, 123 and 126, respectively (Fig. 11). These shunt fields are connected across the supply lines L4—L5 at all times. Accordingly, the resistors 143—145 serve to cut down the field current when the motors are idle. Whenever one of these motors is running, its economy resistor is automatically shunted out of the field circuit.

Also associated with the spindle and feed motors (Fig. 11) are the usual starting resistors 146—148 in series with the motor armature, and dynamic braking resistors 149—151 in shunt with the armatures. Cutting of these resistors into and out of circuit for proper starting and stopping is accomplished by suitable control relays as hereinafter described.

The rapid traverse motors 22 and 50 of the power packs B and C, respectively, the clamp motors 68—70, and the lubricant pump motor 62 have all been shown as conventional constant speed three-phase alternating current motors (see Fig. 13). These motors are reversed by changing the order of the phase connections of their windings in the usual manner through the medium of suitable reversing contactors.

In the control circuits, the manually operable control switches on the pendant 63 (Fig. 6) are connected through low voltage conductors leading through the flexible conduit 64 to a group of low voltage control relays in the low voltage control network (Fig. 7), viz: control relays 1CR to 15CR inclusive, a spindle jog control relay JS, a spindle run relay CRR, spindle direction control relays FS and BS energizable respectively for forward and backward rotation of the spindle, a spindle overload relay OLS, and a spindle motor circuit maintaining relay RS. Also included in the low voltage network (Fig. 8) is a set of primary control relays for the feed motor 21 of the B power pack including a fast feed relay FFB, a jog relay JB, a run relay RB, and forward and backward reversing relays FB and BB. Further, in this low voltage control network is a similar set of primary control relays for the feed motor 49 of the C power pack including a fast feed relay FFC, a jog relay JC, a run relay RC, and forward and backward reversing relays FC and BC. Finally, the low voltage network includes a lubricating pump motor control relay LP and an associated time delay relay TD for governing the energization of the lubricant pump motor 62.

From the foregoing it will be seen that the designation symbols for the various low voltage relays indicate to some extent the apparatus with which they are associated and the funuctions performed. The same style of symbols has been used for the other relays and contactors in the remaining control networks described below. In each case, the contacts or switches actuated by each relay are designated by the same symbol using succeeding numbers to indicate the particular set of contacts. For example, the sets of contacts for the control relay 1CR are 1CR1, 1CR2, etc.

The feed motor 21 of the B power pack is controlled through the medium of a set of secondary relays or contactors (Fig. 9) including: an accelerating relay FAB, a time delay relay 11B for controlling the starting resistance 147 and including main and neutralizing windings 11BM and 11BN, a starting resistance controlling relay 1AB controlled by the time delay relay 11B, direction controlling contactors 1FB and 2FB for forward rotation and 1RB and 2RB for reverse rotation, a dynamic braking relay DBB, and a field decelerating relay FDB, the current coils for the accelerating relay FAB and decelerating relay FDB as well as the actuating winding for an overload relay OLB being shown in Fig. 11. A non-plugging relay PLB (Fig. 11) is also provided. A similar set of secondary control relays or contactors (Fig. 9) for the feed motor 49 of the C power pack includes: an accelerating relay FAC, a starting resistor controlling time delay relay 11C having a main winding 11CM and a neutralizing winding 11CN, a starting resistance control relay 1AC, direction controlling contactors 1FC and 2FC for forward rotation, a dynamic braking relay DBC and a field decelerating relay FDC. A non-plugging relay PLC (Fig. 11) is also provided. As is the case of the other set of intermediate relays described above, the current windings for the accelerating and decelerating relays FDC and FAC, as well as an overload relay OLC are shown in Fig. 11.

For the spindle motor 19 a set of secondary control relays or contactors (Fig. 10) is provided, including time delay starting relays 11S and 12S having respectively main and neutralizing windings 11SM—11SN and 12SM—12SN, reversing contactors 1FS and 2FS for forward rotation and 1RS and 2RS for reverse rotation, and a dynamic braking relay DBS. An overload relay OLS and a non-plugging relay PLS for the spindle motor are shown in Fig. 11.

The rapid traverse motors 22 and 50 of the B and C power packs, respectively, are controlled by corresponding sets of secondary reversing contactors RAB—RRB and RAC—RRC (Fig. 2). The ram clamping motor 70 is connected for clamping and unclamping movement respectively by reversing contactors RL and RU. Similarly, the housing and saddle clamping motors 68 and 69 are controlled for clamping and unclamping movement by corresponding sets of reversing contactors HL and HU and VL and VU. Also, associated with each of the group of three-phase motors 22, 50, 62 and 68—70 shown in Fig. 13 are corresponding overload relays OLRB, OLRC, OLLP, HOL, VOL and ROL, respectively, which are actuated to open their normally closed contacts in response to an overload current flowing to the respective motors.

Overtravel of the machine elements is prevented by suitable limit switches included in the motor control circuits. These include (Fig. 8) switches 3LS and 4LS arranged to be opened respectively at the opposite limits of travel for the saddle 15, switches 1LS and 2LS correspondingly associated with the housing 17 and switches 5LS and 6LS cooperating with the ram 14.

Spindle Drive

Preliminary to starting the spindle motor 19, the direction selector switch 110 (Fig. 6) on the pendant 63 is set for either right or left hand rotation, as may be desired. For the present it will be assumed that the switch 110 is set in its "RH" position as shown in Fig. 6. This preliminary setting of the switch 110 energizes the direction control relay FS (Fig. 7) thereby closing its contacts FS1 in a circuit later to be completed for the "run" relay RS and opening its interlock contacts FS2 which prevent simultaneous energization of the other direction relay BS. The contacts FS3 (Fig. 10) in the secondary control network are also closed. It will be noted that the direction control relay FS (Fig. 7) is connected across supply lines L6—L8, current being supplied to the latter supply line from the supply line L7 through normally closed contacts OLS1 of the spindle overload relay. In the event of an overload on the spindle motor, these contacts OLS1 will open to drop out all of the relays supplied from the conductor L8. These include the secondary control relays for the B and C power pack feed motors (shown in Fig. 8) so that these motors will also be stopped simultaneously with the spindle motor in the event of an overload upon the latter.

As a further preliminary, current of proper potential is, of course, supplied to all of the sets of supply lines. As a result, the neutralizing windings LSN and 12SN of the time delay relays 11S and 12S (Fig. 10) are energized and furthermore, the main winding 12SM of the spindle accelerating contactor or relay 12S is energized through normally closed contacts 1RS3, 1FS3 and RS1 while the main winding 11SM of the relay 11S is energized through contacts 1RS1 and 1FS3. Accordingly, the contacts 12S1 and 11S1 of the relays 12S and 11S (Fig. 11) open to insert all of the starting resistance 146 in series with the spindle motor armature 119. Furthermore, the contacts 12S2 are closed to shunt out the field rheostat 128 so that the spindle motor will start on full field.

In brief, the time delay relays 11S and 12S act to cut out the starting resistance 146 for the spindle motor circuit in two steps during starting and to insert the field rheostat 128 in the circuit when the motor comes up to speed. The main and neutralizing windings of these relays are opposed. When the main winding is open-circuited, its magnetic field decays and is overcome by the opposed neutralizing winding field after a time interval determined by the strength of the latter. This neutralizing field strength may be varied at will by the setting of a shunt connected variable resistor, shown herein (Fig. 10) as a resistor, 152 for the winding 11SN and 153 for 12SN.

With the spindle motor circuits preliminarily conditioned as described above, the operator need only depress the spindle "run" push button 106 (Figs. 6 and 7) momentarily in order to start the spindle motor 19. Such momentary closure of the switch 106 initiates a starting cycle for the spindle motor 19 in which it is started with full shunt field and the starting resistance 146 in circuit and, after coming up to speed, the starting resistance is automatically cut out and the speed adjusting rheostat 128 placed in series with the shunt field 120. In particular, closure of the "run" switch 106 momentarily energizes the control relay CRR (Fig. 7) which in turn energizes the running relay RS through its contacts CRR1. The relay RS is maintained energized, however, through a sealing circuit in shunt with the contacts CRR1 and including contacts RS2, FS1 and switch 110.

Actuation of the running relays RS in turn completes an energizing circuit for the dynamic braking relay DBS (Fig. 10) through contacts 11S3, 12S3, PLS1, and RS3. The dynamic braking relay DBS then opens its contacts DBS1 (Fig. 11) to open-circuit the dynamic braking resistor 149 and closes its contacts DBS2 to complete energizing circuits for the direction control contactors 1FS and 2FS. These latter contactors thereupon close their respective contacts 1FS1 and 2FS1 (Fig. 11) to connect the spindle motor armature 119 across the supply lines L4—L5 for rotation of the spindle in the selected right hand direction. In this way, the spindle motor armature 119 and series field 121 are connected across the supply lines for starting of the motor, and the shunt field 120 is connected across the same supply lines through contacts RS4 of the running relay RS, which are in shunt with the economy resistor 143.

The next step in the starting cycle is the dropping out of the first time delay relay 11S due to the open-circuiting of its main winding 11SM by opening of the contacts 1FS3. When the relay 11S drops out, after a time interval determined as described above, it closes its contacts 11S1 (Fig. 11), to shunt out part of the starting resistor 146, and also opens its contacts 11S2 to deenergize the main winding 12SM of the second time delay relay 12S (Fig. 10). After its selected time interval this latter relay therefore drops out, thereby closing its contacts 12S1 to shunt out the remainder of the starting resistance and also opens its contacts 12S2 to remove the previous shunt from about the rheostat 128 (Fig. 11). Accordingly, the motor 19 is brought up to speed with all of the starting resistance finally cut out and the speed adjusting rheostat in circuit.

A starting cycle of the same character is used when the spindle direction selector 110 is set in its "LH" position for left hand rotation of the spindle. The only difference is that the selector switch 110 thus energizes its other direction relay BS rather than the relay FS and, consequently, the spindle motor main contactors 1RS and 2RS (Fig. 10) are closed so that the spindle motor is connected to the supply lines L4—L5 (Fig. 11) through the contacts 1RS1 and 2RS1. The action of the other associated relays is the same in either case.

Speed changes for the spindle motor 19 may be made while it is running by simply depressing the "run" button 106 and holding down the "faster" or "slower" buttons 107 or 108 until the corresponding speed change is accomplished. Holding down the "run" button 106 retains its relay CRR energized (Fig. 7) so that the latter's contacts CRR2 (Fig. 10) remain closed in the circuit of the rheostat adjusting motor 131. Accordingly, if the "faster" button 107 is also held closed its relay 14CR (Fig. 7) is energized and the latter's contacts 14CR (Fig. 10) complete a circuit for the motor 131 and its field 137 so that this motor rotates the rheostat 128 in a direction to increase the spindle motor speed. Similarly, if the "run" button 106 and the "slower" button 108 are simultaneously held down the relay contacts CRR2 will be closed and the other speed change relay 15CR (Fig. 7) will be energized and its contacts 15CR1 closed (Fig. 10). In this way, the rheostat adjusting motor 131 is energized with its field 138 in circuit and the rheostat 128 is turned in a direction to decrease the speed of the spindle motor 19. In either case stoppage of the speed adjustment is effected by merely releasing the "faster" or "slower" button 107 or 108 so that its corresponding relay 14CR or 15CR is deenergized and the rheostat adjusting motor 131 stopped.

To stop the spindle motor 19 the operator momentarily depresses the spindle "jog" button 109 (Fig. 6). This "jog" push button energizes the "jog" relay JS (Fig. 7) so that its contacts JS1 are opened to drop out the running relay RS. Deenergization of this latter relay in turn open-circuits the one of the sets of main contactors 1FS—2FS or 1RS—2RS, which has previously been energized through its contacts RS3 (Fig. 10) so that the spindle motor is stopped. Opening of these same contacts RS3 also deenergizes the dynamic braking relay DBS (Fig. 10) so that the relay contacts DBS1 close (Fig. 11) and connect the dynamic braking resistor 149 across the spindle motor armature 119 for dynamic braking of the spindle motor in the usual manner. It should be noted here that contacts RS5 and RS6 of the "run" relay RS are also included in the control circuits for the feed motors of the B and C power packs (Fig. 8) so that these latter feed motors can only be maintained in sustained operation when the spindle motor 19 is in operation or, in other words, when the spindle motor running relay RS is energized. Accordingly, the "jog" button 109 serves as a safety-stop device for stopping the entire machine in response to its momentary actuation. Desirably this "jog" button may be given a distinctive color so that it can be readily located by the operator in case of emergency.

So-called "plugging" of the spindle motor 19 is prevented by the non-plugging relay PLS. As noted above its contacts PLS1 are included in the initial circuit (Fig. 10) for the two sets of main contactors 1FS—2FS and 1RS—2RS so that these contactors can only pick up when the relay PLS is deenergized or, in other words, when there is no voltage across the motor armature since the PLS relay is connected across the latter (Fig. 11). In the event that the spindle motor is at rest when the starting cycle is initiated, the relay PLS will be deenergized and, hence, its contacts PLS1 will be closed. Then, after the starting cycle has been initiated and one of the main contactors 1FS or 1RS picked up, the latter's contacts 1FS2 or 1RS2 complete a circuit (Fig. 10) for the corresponding set of contactors in shunt with the contacts PLS1. As a result, the subsequent opening of the contacts PLS1 as the spindle motor comes up to speed, and hence energizes the relay PLS, will not drop out the main contactors. After the main contactors have been opened for stopping of the spindle motor, however, they cannot be reclosed until any voltage produced by the rotating spindle motor armature has died down so that the relay PLS is deenergized and its contacts PLS1 reclosed.

To adjust the angular position of the spindle 13 it is sometimes desirable to turn the spindle at a slow jogging speed. For this purpose the operator holds down the "jog" button 109 (Fig. 6. While the "jog" button is so held down the spindle motor 19 will turn the spindle at a slow jogging speed and stop as soon as the "jog" button is released. Closure of the "jog" button switch 109 energizes the jog relay JS (Fig. 7) as previously noted so that it opens its contacts JS1 to drop out the running relay RS in the event that the spindle motor has been in operation and also to prevent the establishment of a self-maintained energizing circuit for the spindle motor. Additionally, the jog relay closes its contacts JS2 (Fig. 10) so that the relay DBS is energized to open-circuit the dynamic braking resistor and to pick up one or the other of the sets of main contactors 1FS—2FS or 1RS—2RS (through contacts FS3 or BS3 and DBS2, JS2, PLS1, 12S3 and 11S3). The spindle motor is thus started in the direction determined by the direction selector 110 and continues to rotate in such direction until the "jog" button 109 is released, thereby open-circuiting the jog relay JS which in turn opens its contacts JS2 to open-circuit the main contactors. During this motor operation a third set of contacts JS3 on the jog relay (Fig. 11) shunt the economy resistor 143. While jogging, the spindle motor 19 operates on full shunt field since the contacts RS1 (Fig. 10) remain closed and hence retain the time delay winding 12SM energized so that the contacts 12S2 remain closed to keep the rheostat 128 shunted out of the field circuit.

LOCK CONTROL

All of the clamping or locking mechanisms 65—67 for the column 17, saddle 15 and ram 14, respectively (Fig. 1) are controlled from the single "lock" push button switch 116 on the pendant 63 (Fig. 6). To place this "lock" button in control of a desired one of the clamping mechanisms 65—67 the selector switch 105 is turned to its corresponding position. Then to actuate the mechanism the operator momentarily depresses the "lock" button. Thereafter, the mechanism will remain in its clamped or locked position until the controls are actuated to start the drive for the clamped machine element, at which time the clamping mechanism is automatically released before the drive starts.

Figure 12:
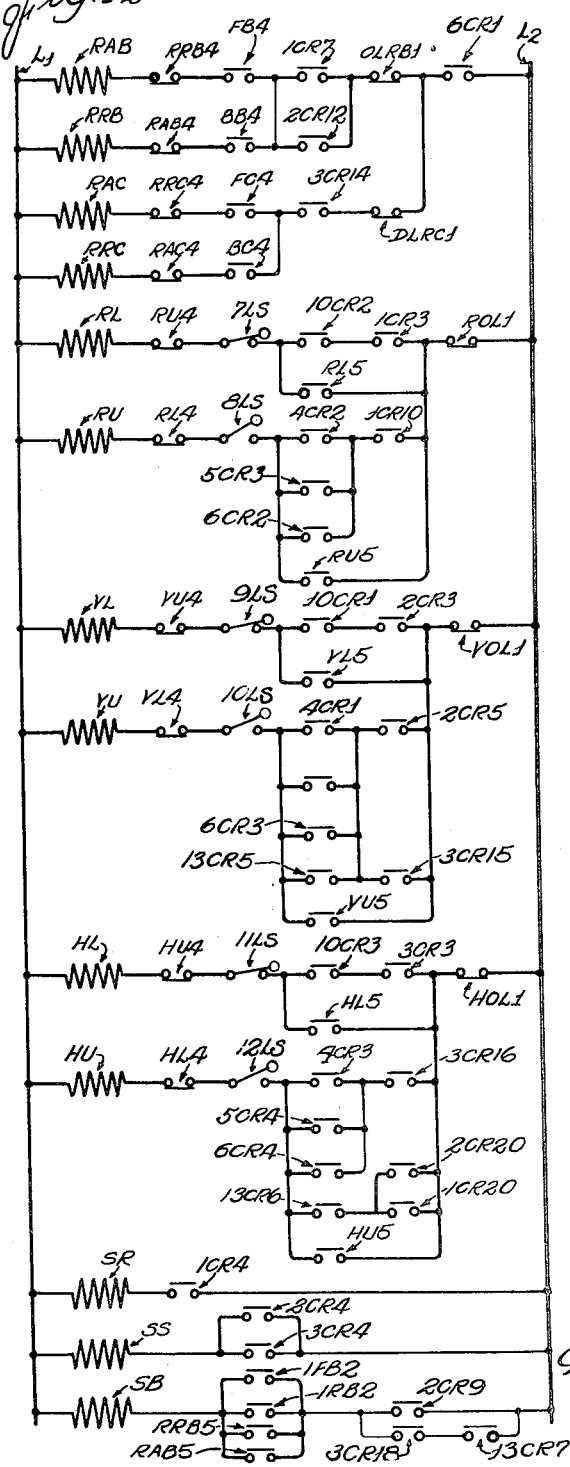
Fig. 12 is a wiring diagram of the intermediate or secondary control circuits for the rapid traverse, clamp and pump motors.

With the selector switch 105 in its "vert" position shown (Figs. 6 and 7) the "lock" push button switch 116 is in operative relation with the clamping mechanism 66 for the vertically movable saddle 15. Momentary closure of the "lock" switch 116 energizes its control relay 10CR. The selector relay 2CR is already energized through the selector switch 105 and interlock contacts 1CR1 and 3CR1, which prevent simultaneous closure of the other selector relays 1CR and 3CR. Accordingly, the main contactor VL for energizing the motor 69 for rotation in a direction to set the clamps, is energized through relay contacts VOL1, 2CR3, 10CR1, the limit switch 9LS, and interlock contacts VU4 on the other main contactor for the motor 69 (Fig. 12). Energization of this contactor VL connects the motor 69 to supply lines $L_1$—$L_2$—$L_3$ through contacts VL1—VL3 so that it rotates in a clamping direction (Fig. 13), the contactor being maintained energized through a sealing circuit including its contacts VL5. Automatic stoppage of the clamping motor 69 is accomplished at the termination of the clamping operation by opening of the limit switch 9LS, which drops out the main contactor VL and thereby deenergizes the motor 69. It should be noted that even continued closure of the "lock" switch 116 will not reenergize the motor 69 for further clamping so long as the limit switch 9LS is open. In the event of an overload, the overload relay VOL opens its contacts VOL1 dropping out the contactor VL to stop the motor 69.

The clamping operations for the ram 14 and horizontally traversable housing 17 are similar to that for the saddle 15 described above. In particular, when the selector switch 105 is set in its "ram" position the corresponding selector relay 1CR is energized through the switch 105 and interlock contacts 2CR2 and 3CR2 (Fig. 7) so that its contacts 1CR3 are closed (Fig. 12). Accordingly, energization of the "lock" relay 10CR, with the selector 105 in the "ram" position, closes its contacts 10CR2 to complete a circuit for the main contactor RL through these contacts as well as relay contacts 1CR3, ROL1, limit switch 7LS and interlock contacts RU4 (Fig. 12). The contactor RL in turn connects the ram clamping motor 70 to supply lines $L_1$—$L_2$—$L_3$ through its contacts RL1—RL3 (Fig. 13), the contactor RL being maintained energized through its sealing contacts RL5. Similarly, if the selector 105 is in its "horz" position (Fig. 7) the corresponding selector relay 3CR is energized through the switch 105 and interlock contacts 1CR2 and 2CR1. Consequently, the lock relay 10CR may be energized to close its contacts 10CR3 and complete an energizing circuit for the contactor HL (Fig. 12) through not only these contacts but also relay contacts 3CR3, HOL1, limit switch 11LS and interlock contacts HU4, the contactor remaining energized through its sealing contacts HL5. When this contactor HL picks up, the housing clamping motor 68 is energized from the supply lines through its contacts HL1—HL3. In each case the clamping motor 68 or 70 is stopped by the opening of its corresponding limit switch 11LS or 7LS and in the event of overload will be stopped by opening of its overload relays' contacts HOL1 or ROL1.

To rotate the motors 68—70 in the opposite direction for unclamping operation, the other main contactors HU, VU and RU, respectively, are closed (Fig. 13) to connect the motors to the supply lines through the corresponding sets of contacts HU1—HU3, VU1—VU3 and RU1—RU3 (Fig. 13). Energization of these contactors is accomplished as an incident to the starting of the drive mechanisms for the respective machine tool elements as hereinafter described in connection with the operation of the controls for these drive mechanisms.

MAIN CONTROLS

As a preliminary to use of the "main" group of controls, the two selectors 105 and 115 (Fig. 6) must be set for the desired operation. Of these two switches, the selector 105 determines the element to be governed by the "main" controls while the other determines its direction of movement. Considering first the element selector 105, preliminary setting of it in its "vert" position shown in Fig. 6 energizes the selector relay 2CR (Fig. 7) to close its contacts 2CR4 (Fig. 12) and thereby energize the solenoid SS so as to engage the clutch 38 (Fig. 1) for connecting the B power pack to the vertically movable saddle 15. Similarly, setting of this selector 105 in its "horz" position energizes the selector relay 3CR (Fig. 7) again energizing the solenoid SS but this time through the contacts 3CR4 (Fig. 12). Incidentally, it should be noted that when the selector 105 is in this "horz" position, the "main" controls are connected with the C power pack and the "auxiliary" controls govern the B power pack which is connected to the saddle 15. Finally, when the selector 105 is in its "ram" position the selector relay 1CR is energized and closes its contacts 1CR4 (Fig. 12) to energize the solenoid SR for engaging the clutch 33 (Fig. 1) to connect the B power pack in driving relation with the ram 14.

The second or direction selector 115 noted above is, of course, preliminarily positioned for the desired direction of movement of the element to be operated. When in its "up" or "forward" position the relay 7CR is energized and, correspondingly, when in its "back" or "down" position the relay 8CR is energized (Fig. 7). As a result the corresponding secondary direction relay FB or BB (Fig. 8) is energized (assuming the element selector 105 is in its "vert" position as previously noted). In particular, the relay FB is energized in response to the energization of the primary relay 7CR through the overload relay contacts OLB1, limit switch 10LSA, and relay contacts 1CR5, 2CR7, 7CR1, limit switches 3LS and 1LS, and interlock contacts BB2. Similarly, if the other direction relay 8CR is energized it in turn energizes the alternative secondary direction relay BB (Fig. 8) through contacts OLB1, limit switches 10LSA, relay contacts 1CR5, 2CR6, 8CR1, limit switches 4LS and 2LS, and interlock contacts FB2. In general, the alternative direction relays FB and BB condition respective energizing circuits for the feed motor 21 for subsequent completion during the feed motor starting cycle described below.

In starting the drive for the machine element selected for control by the "main" group of controls, the operator simply pushes the "run" button 111 (Fig. 6) irrespective of whether or not the selected element is clamped. If it is clamped, the actuation of the "run" button will cause it to be automatically unclamped before the drive starts. If it is not clamped, then the drive starts at once. It will first be assumed that the element selector 105 is set in its "vert" position to connect the B power pack to the saddle 15 and that the saddle is clamped on its ways by the clamping mechanism 66. In such case, the selector relays 2CR and 7CR are, therefore, both energized (Fig. 7) and the intermediate direction selector relay FB is also energized as previously noted (Fig. 8). With the parts so arranged, to unclamp the saddle 15, the operator momentarily depresses the main "run" push button 111. Closure of this "run" button switch 111 energizes its control relay 4CR (Fig. 7) so that the latter's contacts 4CR1 (Fig. 12) are momentarily closed to establish an energizing circuit for the unclamping contactor VU (through contacts VOL1, 2CR5, 4CR1, limit switch 10LS and interlock contacts VL4) to energize the motor 69 for unclamping movement. The contactor VU remains energized through its sealing contacts VU5. The unclamping movement continues until at its termination the limit switch 10LS opens to drop out the contactor VU and, of course, in the event of overload the contactor will be dropped out to stop the motor 69 by opening of the overload relay contacts VLO1.

In a similar manner, if the selector 105 is set in its "ram" or "horz" positions (Fig. 6), the corresponding selector relays 1CR or 3CR are energized so that when the "run" button 111 is depressed and the run relay 4CR momentarily energized circuits will be completed correspondingly for the unclamping contactors RU or HU of Fig. 12 (through a circuit including contacts ROL1, 1CR10, 4CR2, limit switch 8LS and interlock contacts RL4 for the contactor RU, and similarly through contacts HOL1, 3CR16, 4CR3, 12LS and HL4 for the contactor HU). In each case, the circuits are sealed through sealing contacts RU5 and HU5, respectvely, and are opened at the ends of the unclamping movements by limit switches 9LS and 12LS, respectively.

After the unclamping operation for the selected element its feed motion is started by again momentarily depressing the main "run" button 111. If desired, this "run" button can be held down throughout the unclamping operation and for a sufficient time thereafter to start the feed.

Before proceeding to a description of the feed motor starting cycle attention should be given, however, to the initial condition of certain of the relays which take part in the cycle, particularly the time delay relays 11B and 11C. These are associated respectively with the controls of the feed motors 21 and 49 in the B and C power packs. In general, they cause relays 1AB and 1AC to close their contacts and shunt out the starting resistors 147 and 148 (Fig. 11) of the respective feed motors as the latter come up to speed, and also deenergize the relays FAB and FAC to remove shunts from about the field rheostats 129 and 130. Thus, the motors are started with the starting resistors in circuit and on full shunt field. The time delay relays are of the same general type as the relays 11S and 12S (Fig. 10) associated with the spindle motor 19 and previously described, although only one rather than two is used for each feed motor. In the case of the relays 11B and 11C the time delay interval for opening of the relay is regulated by variable resistors 154 and 155, respectively (Fig. 9). With the feed motors 21 and 49 in the B and C power packs, respectively, stopped and voltage on the supply lines L4—L5, both the main and neutralizing windings of the relays 11B and 11C are energized. The main windings 11BM and 11CM are connected across the supply lines through sets of relay contacts 1RB1, 1FB3 and 1RC1, 1FC3, respectively. The relays 11B and 11C are thus conditioned to perform their timing operations during starting of the respective feed motors. Furthermore, the relays FAB and FAC are energized (through contacts 11B2 and 11C2) so that their respective contacts FAB1 and FAC1 (Fig. 11) are closed to shunt out the feed motor rheostats. Similarly, the relays 1AB and 1AC are open-circuited by contacts 11B3 and 11C3 (Fig. 9) so that their contacts 1AB2 and 1AC2 are open (Fig. 11) and the starting resistors in circuit.

For an exemplary feed motor starting cycle, it will be assumed as before that the element selector 105 is in its "vert" position to connect the B power pack to the saddle 15 and to place this power pack under control of the "main" controls. Further, assume that the spindle motor 19 is running so that the interlock contacts RS5 and RS6, previously noted, are closed, and that the direction selector 115 is in its "up" position. In such case, a momentary closure of the "run" switch 111 energizes the run relay 4CR (Fig. 7) thereby momentarily closing its contacts 4CR4 (Fig. 8) to energize the running relay RB (through contacts OLB1, limit switch 10LSA, contacts 1CR5, 3CR3, 4CR4 and JB1). Since the limit switch contacts 10LSA are only closed when the saddle clamping mechanism 66 is in its unclamped position, it will be seen that the feed motor 21 is effectively interlocked against starting until the unclamping operation is complete. The running relay RB maintains itself closed (through a sealing circuit including contacts OLB1, 10LSA, 1CR5, 2CR7, 7CR1, limit switch 3LS, contacts 2CR8, FB1, RS5, RB1, 3CR6, and JB1). Closure of the running relay contacts RB2 (Fig. 9) picks up the relay DBB (through an initial circuit including contacts 11B1, PLB1, 1AB1 and 2RB2) which in turn energizes the main contactors 1FB and 2FB (through an initial circuit including contacts 11B1, PLB1, 1AB1, RB2, DBB1 and FB3).

The main contactors 1FB—2FB connect the feed motor armature 122 (Fig. 11) to the supply lines L4—L5 through their contacts 1FB1 and 2FB1, the contactors being maintained closed through the sealing contacts 2FB2 (Fig. 9). Also, the main contactor 1FB energizes the solenoid SB (Figs. 1 and 12) to release the saddle brake (through contacts 1FB2 and 2CR9). Additionally, the relay DBB opens its contacts DBB2 (Fig. 11) to cut out the dynamic braking resistance 150 and the running relay RB closes its contacts RB3 to shunt out the economy resistor 144. Consequently, the feed motor 21 starts in the selected direction of rotation with full shunt field excitation and the starting resistor 147 in its armature circuit. If the direction selector switch 115 is initially set in its other position, the starting operation is the same except that the direction relays 8CR and BB (rather than 7CR and FB) are energized with the result that the alternative set of main contactors 1RB and 2RB are closed rather than 1FB and 2FB.

Energization of the running relay RB also opens its contacts RB1 (Fig. 9) deenergizing the time delay relay main winding 11BM so that after a selected time interval this relay closes its contacts 11B1 to energize the starting resistor control relay 1AB (Fig. 9). It in turn closes its contacts 1AB2 (Fig. 11) to shunt out the starting resistor 147. Additionally, the time delay relay opens its contacts 11B2 (Fig. 9) to deenergize the relay FAB so that the latter contacts FAB1 (Fig. 11) open and remove the shunt from about the speed adjustment rheostat 129. Accordingly, the feed motor 21 is brought up to speed with all of the starting resistance finally cut out of its armature 122 and the rheostat 29 inserted in the shunt field circuit.

Speed changes may be made for the feed motor 21 while it is running by simply depressing the "run" button 111 and holding down the "faster" or "slower" buttons 107 or 108 until the corresponding speed change is accomplished. Holding down the "run" button 111 retains its relay 4CR energized (Fig. 7) so that the latter contacts 4CR7 (Fig. 10) remain closed in the circuit of the rheostat adjusting motor 132. Accordingly, if the "faster" button 107 is also held closed, its relay 14CR (Fig. 7) is energized and the latter contacts 14CR1 (Fig. 10) complete an energizing circuit for the motor 132 and its field 139 so that this motor rotates the rheostat 129 in a direction to increase the feed motor speed. Similarly, if the "run" button 111 and the "slower" button 108 are simultaneously held down, the relay contacts 4CR7 and the other speed change relay 15CR (Fig. 7) will be energized so that its contacts 15CR1 are closed (Fig. 10). In this way, the rheostat adjusting motor 132 is energized with its field 140 in circuit and the rheostat 129 is turned in a direction to decrease the speed of the feed motor 21. It should be noted here that with the B power pack connected to the saddle 15, as assumed above, the rheostat motor circuit is completed through the selector relay contacts 2CR10. If the B power pack is, however, connected to the ram, the rheostat motor circuit will be completed through the selector relay contacts 1CR6. On the other hand, if the B power pack is operated under the control of the "auxiliary" set of controls rather than the main set, the rheostat motor circuit is completed through the selector relay contacts 3CR7 and the "profile" relay contacts 13CR1.

To stop the feed motor 21, it is only necessary momentarily to depress the main "jog" button 112 (Fig. 6). This picks up the jog relay 5CR (Fig. 7) which, in turn, energizes the secondary jog relay JB (Fig. 8) through its contacts 5CR1 and the selector relay contacts 2CR11, 1CR5, limit switch 1OLSA and contacts OLB1. Thereupon, the contacts JB1 in the circuit of the running relay RB are opened to drop out this relay so that the main set of contactors 1FB—2FB or 1RB—2RB are opened (Fig. 9) and the feed motor 21 stopped. Notable here is the fact that if the spindle "jog" button 109 (Fig. 6) is momentarily depressed it similarly drops out the spindle running relay RS, as previously described so that the latter's contacts RS5 (Fig. 8) are opened and the B power pack running relay RB deenergized to also stop the feed motor 21. In either case, when the feed motor 21 is stopped, the relay DBB is dropped out (by opening of contacts RB2 in Fig. 9) so that the dynamic braking resistor 149 (Fig. 11) is connected across the motor armature by contacts DBB2.

The rates of acceleration and deceleration of the feed motor 21 are limited to safe values by the usual accelerating and decelerating relays FAB and FDB, respectively. Upon too rapid acceleration relay FAB closes its contacts FAB1 (Fig. 11) to shunt out the rheostat 129 and place full shunt field on the motor. As soon as the rate of acceleration drops back to a safe value, the contacts FAB1 reopen without affecting the setting of the speed controlling rheostat. In the event of too rapid deceleration, the relay FDB swings its contact FDB1 from the position of Fig. 11 to the left thereby substituting a resistor 156 in the shunt field circuit for the rheostat 129 to cut down the shunt field excitation and thereby diminish the rate of deceleration. It may be noted here that the same arrangement is provided for the feed motor 49 in the C power pack including accelerating and decelerating relays FAC and FDB. Contacts FAC1 of the accelerating relay shunt the rheostat 130 and contacts FDC1 substitute the fixed resistor 157 for the rheostat.

To prevent plugging of the feed motors 21 and 49 in the respective B and C power packs, non-plugging relays PLB and PLC are utilized (Fig. 11). These relays operate in substantially the same manner as non-plugging relay PLS for the spindle motor described above. In each case they are provided with contacts PLB1 and PLC1 (Fig. 9) included in the initial circuits for the main contactors (1FB—2FB and 1RB—2RB in one case and 1FC—2FC and 1RC—2RC in the other) so as to prevent energization of these contactors until the feed motor armature has come to rest.

In order to jog the feed motor 21 with the selectors 105 and 115 set as previously assumed, the operator need only hold down the "jog" button 112 (Fig. 6). While the "jog" button is held down the feed motor 21 operates at a low jog speed and stops as soon as the "jog" button is released. Closure of the "jog" button switch 112 energizes the primary jog relay 5CR (Fig. 7) as previously noted so that it picks up the secondary jog relay JB (Fig. 8) which in turn drops out the running relay RB in the event that the feed motor is in operation at the time and in any event prevents establishment of a self-maintained energizing circuit for the feed motor. Additionally, the relay JB closes its contacts JB2 (Fig. 9) so that one or the other of the sets of main contactors 1FB—2FB or 1RB—2RB (depending upon the setting of the direction selector 115) are energized to start the feed motor in the manner previously described. The feed motor continues operating under the control of the "jog" button until the latter is released, at which time both the primary and secondary jog relays 5CR and JB drop out and the main contactors are opened to stop the motor. During this motor operation, a third set of contacts JB3 (Fig. 11) on the secondary jog relay (Fig. 11) shunt the economy resistor 144. While jogging, the feed motor 21 operates on full shunt field and, hence, at low speed, since the contacts JB4 (Fig. 9) retain the time delay relay 11B energized so that the relay FAB is energized and its contacts FAB1 closed to shunt the rheostat 129 (Fig. 11).

For rapid traversing of the saddle 15 with the selectors set as previously assumed, the operator holds down the "traverse" button 113 (Fig. 6) throughout the desired rapid traversing movement. Closure of this "traverse" switch 113 picks up the associated primary relay 6CR (Fig. 7) thereby closing its contacts 6CR1 (Fig. 12). This in turn completes a circuit for the B power pack traverse motor contactor RAB (through contacts 6CR1, OLRB1, 2CR12, FB4, and interlock contacts RRB4). Energization of this contactor RAB connects the rapid traverse motor 22 to supply lines L₁—L₂—L₃ through its contacts RAB1—RA3 (Fig. 13). Accordingly, the rapid traverse motor is started and continues in operation until the traverse push button 113 is released to drop out its relay 6CR and the contactor RAB. It will be clear that if the direction selector 115 is set for "down" movement, the direction relay contacts BB4 (Fig. 12) will be closed rather than the contacts FB4 so that the other main traverse contactor RRB will be energized and close its contacts RRB1—RRB3 to connect the traverse motor 22 for rotation in the opposite direction. Similarly, if the element selector 105 is set in its "ram" position, one or the other of the rapid traverse contactors RAB or RRB is energized through the corresponding selector contacts 1CR7 rather than 2CR12. The machine tool element which is operating under the "main" group of controls can thus very readily be operated at a rapid traversing speed whenever desired as, for example, in approaching the tool to the work piece.

Rapid traversing may be initiated either when the associated feed motor is running or is stopped. The circuits, set forth above, for the rapid traverse contactors RAB and RRB are independent of the feed motor controls and can therefore be completed whether or not the feed motor is running. Additional contacts RAB5 and RRB5 (Fig. 12) on these contactors insure energization of the brake solenoid SB when the rapid traverse motors are running alone. In the event the feed motor is also running, release of the "traverse" button 113 stops the rapid traverse motor as noted but leaves the feed motor running so that the driven machine tool element drops back to its previous slow feed speed.

In some machining operations, it is desirable to move the machine tool element, governed by the "main" group of controls, at a so-called fast feed speed or, in other words, at a speed intermediate the usual feed speed range and the much faster rapid traversing speed. This operation is particularly useful when a light cut is to be made so that the work and tool can be moved relative to each other at a speed substantially in excess of that for a heavy cut. If the selectors are set in the manner previously assumed, then the operator can run the feed motor 21 at a fast feed rate by simply holding down the "fast feed" button 114 (Fig. 6). This push button 114 picks up its primary relay 9CR (Fig. 7) which in turn picks up the secondary fast feed relay FFB (Fig. 8), energizing the same through contacts OLB1, 10LSA, 1CR5, 2CR11, and 9CR1. This relay FFB in turn opens its contacts FFB1 (Fig. 9) to open a shunt normally placed about a resistor 158 in the energizing circuit of the potential winding of the relay FDB. As a result, the energization of this winding is diminished so that the relay FDB swings its contact FDB1 (Fig. 11) to shunt the rheostat 129 by the fixed resistor 156. Consequently, the shunt field excitation of the feed motor 21 is reduced and it operates at a fast feed speed. As soon as the fast feed button 114 is released, the relays 9CR, FFB, and FDB drop out and the feed motor speed drops back to the value determined by the previous setting determined by the rheostat 129. Notable here is the fact that the decelerating relay FDB performs not only its decelerating control function but also the additional function of controlling the shunt field excitation for the feed motor during fast feed operation through the use of the shunted resistor 158 in its potential winding circuit. The relay FDC in the C power pack control circuit is provided with a similar resistor 159 controlled by contacts FFC1 for the same purpose in the control of the C power pack field motor 49.

In the event that the element selector 105 (Fig. 6) is initially set in its "ram" position, rather than its "vert" position as assumed above, the "main" group of controls are connected to the B power pack, but this power pack is connected to the ram 14 rather than to the saddle 15. The feed and rapid traverse motors of the B power pack can, of course, be controlled in the same manner for feeding, fast feeding, rapid traversing and jogging of the ram just as was the case with the movement of the saddle described above. On the other hand, if the element selector 105 is turned to its "horz" position, the "main" group of controls are connected in operative relation with the C power pack which traverses the horizontally movable housing 17. The C power pack, as previously noted, also includes feed and rapid traverse motors and the control circuits for these two motors substantially duplicate those for the corresponding motors of the B power pack. Corresponding reference numerals have been used to identify the controls of the C power pack except that the distinguishing letter "C" is used instead of the letter "B" as in the case of those for the B power pack. The operation of these controls for the C power pack, under the "main" group of manual switches, exactly matches that for the B power pack and, accordingly, a further detailed description of them is believed to be unnecessary.

When any one of the movable machine tool elements, viz., the ram 14, saddle 15, or the column 17, is being driven, its associated limit switches previously noted prevent overtravel. In the case of the ram 14, its limit switches 5LS and 6LS (Fig. 8) are arranged to drop out corresponding ones of the secondary direction relays FC and BC so as to stop the C power pack although leaving the same conditioned for movement in the opposite direction. Similarly, the saddle 15 will be stopped by one of its limit switches 3LS—4LS while the ram will be stopped by one of its limit switches 1LS—2LS in the event of overtravel. It should be noted as to these two latter sets of limit switches, however, that they are in each case connected in shunt to contacts on the element selector relays 1CR and 2CR in such manner that if, say, the saddle 15 has been stopped by one of its limit switches and the element selector 105 is then turned to its ram position, the ram selector relay 1CR will shunt the opened limit switch so that the B power pack can be used to drive the ram without changing the setting of the direction selector 115. In the same way, if the ram has been stopped in one of its limit positions by one of the overtravel prevention switches, the selector 105 can be turned to its "vert" position and the saddle moved by the B power pack without changing the direction selector. This adds greatly to the flexibility of the controls without in any way impairing the safety of operation.

Whenever the column 17 is being traversed, lubricant is desirably supplied to the drive gear 56 (Fig. 1). A pump (not shown) driven by the motor 62 (Fig. 13) serves this purpose. During jogging or intermittent driving of the housing, excessive starting and stopping of the pump motor would be incurred if it were merely started and stopped in synchronism with the C power pack. Accordingly, the time delay relay TD (Fig. 8) is utilized to give a period of overlap or continued operation of the pump motor after the C power pack is stopped so that if the latter is restarted within the time delay period, the pump motor will merely continue to operate without interruption. Whenever either the feed motor 49 or rapid traverse motor 50 of the C power pack are started, the pump motor contactor LP (Fig. 8) is energized (through contacts OLC1, OLP1, TD1, and any one of the following motor reversing contactors which happens to be closed for the particular operation, viz., 1FC4, 1RC4, RAC6, RRC6). Thereafter, the contactor LP is maintained energized through its sealing contacts LP1 and connects the pump motor 62 to supply lines L₁—L₂—L₃ (Fig. 3) through its contacts LP2—LP4. During the time that the C power pack is running, the time delay relay TD (Fig. 8) is retained deenergized, however, by the opening of one of the series of contacts 1FC4, 1RC4, RAC7, and RRC7. Then, when the power pack C is stopped, the time delay relay TD is energized through closure of one of the last named series of contacts and the pump motor contactor LP remains energized through its sealing contacts LP1. Finally, after a predetermined time interval, the relay TD opens its contacts TD1 to drop out the contactor LP and also to deenergize the time delay relay itself. The resultant reclosure of the contacts TD1 returns the circuit to its initial condition but leaves the contactor LP deenergized. Thus, if the power pack C is restarted after only a short interval, there will be no interruption in the pump motor operation.

AUXILIARY CONTROLS

Partial control of a selected one of the machine tool element drives is afforded by the "auxiliary" group of controls (Fig. 6). This group is automatically associated by the element selector 105 with one of the drive mechanisms which is not at the time being governed by the "main" controls. In particular, when the selector 105 is in either its "ram" or "vert" positions (to connect the "main" controls respectively for governing the ram 14 and vertically movable saddle 15), the "auxiliary" controls are connected to the C power pack for controlling the movements of the column 17. Similarly, when the "main" controls are connected to govern the column drive, the "auxiliary" controls are automatically connected to govern the B power pack and, furthermore, the latter is connected to the saddle 15.

In brief, the "auxiliary" controls serve to perform the following controlling functions for the feed motor power pack to which they are connected, viz., stop, start, change direction, and change feed speed. Although less elaborate than the category of control operations accomplished by the "main" controls, this is sufficient for many operations, particularly profiling, in which two of the machine elements are moved simultaneously to produce a resultant cutter movement inclined relative to the ways of the machine elements.

Assuming that the spindle motor 19 is running and that the element selector 105 (Fig. 6) is set in its "horz" position, the "auxiliary" controls will be effectually connected to the B power pack (through circuits established by the selector relay 3CR of Fig. 7 which is energized by the selector switch 105). Furthermore, the solenoid SS (Fig. 12) is energized through contacts 3CR4 to engage the clutch 38 (Fig. 1) to connect the saddle 15 to this B power pack. Accordingly, the operator sets the auxiliary direction selector 118 (Fig. 6) for the desired direction of saddle movement which energizes either the primary direction relay 11CR or 12CR (Fig. 7) depending upon the direction selected. When the relay 11CR is energized, it closes its contact 11CR1 (Fig. 8) to energize the secondary direction relay FB (through contacts OLB1, 10LSA, 1CR5, 3CR8, 11CR1, 3LS, 1LS). Similarly, if the other primary relay 12CR is energized, it closes its contacts 12CR1 to energize the other secondary direction relay BB (through contacts OLB1, 10LSA, 1CR5, 3CR9, 12CR1, 4LS, 2LS). Then, to start the B power pack feed motor 21, the operator holds down the "profile" button 117 (Fig. 7). This switch energizes the "profile" relay 13CR so that it closes its contacts 13CR2 (Fig. 8) for energization of the running relay RB (through contacts OLB1, 2CR14, 1CR5, 3CR8, 11CR1, 3LS, 1LS, FB1, 13CR2, 3CR17, and JB1). It should be noted here that the contacts 3CR5 and 3CR6 are open so that no maintaining circuit is established for the running relay RB. As a result, this relay will drop out again and stop the feed motor as soon as the "profile" button 117 is released. Establishment of the running relay circuit described above causes it to start the feed motor 21 by the starting cycle previously described in connection with the "main" controls. The "profile" button can be held depressed by the latch 117a (Fig. 6) for sustained operation.

To change the speed of the feed motor 21 while it is operating under the "auxiliary" set of controls, the "profile" button 117 is held depressed and one or the other of the "faster" or "slower" buttons 107 and 108 is depressed until the desired speed change is effected. The speed changing operation is substantially the same as that described with respect to the "main" controls above in that the rheostat adjusting motor 135 (Fig. 10) is energized with the desired adjustment of the speed controlling rheostat. In this case, however, the circuit is completed through contacts of the profile relay 13CR rather than through contacts 4CR5 of the main control "run" relay.

When the element selector 105 (Fig. 6) is set in its "vert" or "ram" positions, the corresponding relays 1CR and 2CR cause the "auxiliary" set of controls to be connected to the C power pack. In such case, the same controlling operations can be carried out and in the same manner as those for the B power pack described above. The controls for the C power pack contain elements which are counterparts of the B power pack control system set forth and, accordingly, a further detailed description is believed unnecessary.

BRIEF RESUMÉ OF OPERATION

In starting the machine, power is furnished to all of the various sets of supply lines and the time delay relays 11S, 12S, 11B and 11C are consequently all energized in preparation for the control of the starting cycles of their associated motors. The spindle motor 19 of the A power pack is ordinarily started first, since safety interlocks prevent regular sustained operation of the B and C power pack feed motors except when the spindle motor is running.

Preliminary to starting the spindle motor 19, its direction selector 110 (Fig. 6) is set for the desired direction of spindle rotation. Then, to start the spindle motor 19, its "run" button 106 is depressed momentarily and thereafter the motor starting cycle is automatically carried out. To stop the spindle motor, the "jog" button 109 may be momentarily depressed or the selector 110 shifted to its other position. The speed of rotation may be increased or decreased by holding down the "run" button 106 so as to connect the "faster" and "slower" buttons 107—108 with the rheostat adjusting motor 131 and then holding down either the "faster" or "slower" button until the desired speed change is accomplished. Jogging of the spindle motor is effected by holding down the "jog" button 109.

To clamp in position any one of the several movable machine tool elements, viz: the ram 14, saddle 15, and housing 17, the selector 105 is turned to the corresponding position, and then, the "lock" button 116 momentarily depressed. Unclamping of the element takes place automatically when starting its drive mechanism.

For full control of the operation of a desired one of the machine tool elements, the selector 105 is turned to the corresponding position so as to connect the "main" set of controls to the drive mechanism for the selected element. This selector also automatically connects the B power pack to either the ram 14 or saddle 15, depending upon the setting of the selector, and in the event the "main" controls are connected to the C power pack, for the column 17, the B power pack is connected to the saddle 15. Preliminary to starting the drive mechanism which is connected to the "main" set of controls, the direction selector 115 is set for the desired direction of movement. The feed motor in the selected power pack is then started by momentarily depressing the "run" button 111 and may be stopped by momentarily depressing the "jog" button 112 or by shifting the direction selector 115. Jogging, rapid traversing and fast feeding operations may each be obtained by holding down the corresponding one of the hold-down buttons 112—114. The feed speed may be changed by holding down the "run" button 111 and depressing one or the other of the "faster" or "slower" buttons 107, 108.

For profiling and similar machining operations in which two of the machine elements must be fed simultaneously, the power pack which is not connected to the main controls may be governed by the "auxiliary" set of controls. The setting of the element selector 105 determines automatically the drive mechanism which is connected to the "auxiliary" controls as previously described in detail. The direction of movement of the element which is being governed by the "auxiliary" controls is determined by a preliminary setting of the direction selector 118. The feed motor is set in operation by holding down the "profile" button 117 and stopped by releasing this button. Changes in feed speed are made by holding down the "profile" button 117 and depressing one or the other of the "faster" or "slower" buttons 107—108.

All of the power packs of the machine may be stopped simultaneously as, for example, in the case of an emergency, by momentarily depressing the spindle "jog" button 109.

I claim as my invention:

1. A machine tool comprising, in combination, a plurality of movable machine tool elements, a plurality of releasable means associated with respective ones of said elements for holding the same against inadvertent displacement, power actuating means for driving said elements individually including a starting device, a manual control device for rendering said holding means active, selector means operable independently of said starting and control devices for associating said control device with selected individual ones of said holding means, and means operable in response to an actuation of said starting device to initiate the operation of said power actuating means to drive a selected one of said elements for automatically releasing the holding means for such element.

2. A machine tool having, in combination, a plurality of movable machine elements, individual clamps therefor each adapted when applied to hold its element against inadvertent displacement, power actuating means for driving said elements individually, a common starting device controlling actuation of the respective elements, a common control device actuatable independently of said starting device governing application of any one of said clamps, and a selector means common to both the starting and clamp control devices and operable selectively to associate different ones of said clamps with said control device and simultaneously place the corresponding one of said elements in control of said starting device.

3. A machine tool having, in combination, a plurality of movable machine elements, individual clamps therefor each adapted when applied to hold its element against inadvertent displacement, power actuating means for driving said elements individually, a starting device controlling actuation of the respective elements, a control device governing application of said clamps, a selector member movable into a plurality of different positions, and mechanism operable by said member when moved to its respective positions to associate different predetermined ones of said clamps with said control device and simultaneously place the corresponding one of said elements in control of said starting device.

4. A machine tool having, in combination, a power actuated machine element, a power actuated clamp therefor, a manually actuatable control device operable to apply said clamp, and means including a second control device manually actuatable independently of said first device for releasing said clamp and initiating movement of said element.

5. A machine tool having, in combination, a power actuated machine element, a power actuated clamp therefor, a control device operable to apply said clamp, and a control device operable independently of said first mentioned device and adapted when actuated with said clamp released to initiate movement of said element and when actuated with the clamp applied to successively release the clamp and start said element.

6. A machine tool having, in combination, a power actuated machine element, a power actuated clamp therefor, independent first and second manually actuatable control devices respectively operable to cause application of said clamp and stopping of said element, and a third manually actuatable control device common to the clamp and said machine element and operable when actuated to cause release of said clamp and initiate movement of said element.

7. A machine tool comprising, in combination, a work support, a tool support, means including a plurality of separately movable machine tool elements for effecting relative movement between said supports in corresponding different directions relative to each other, power actuating means for moving said elements, a main set of manual control devices adapted to control said power actuating means for effecting a large variety of operations for an associated one of said elements including: slow feed at a selectively variable speed, faster feed, rapid traversing, stopping, reversal of direction, and jogging; an auxiliary set of manual control devices adapted to control said power actuating means for effecting a more limited variety of operations of an associated one of said elements including: feed at a selectively variable speed, stopping and reversal of direction; and selector means for conditioning said main controls to govern the operation of a selected one of said elements and for conditioning said auxiliary controls to govern the operation of a predetermined one of the remaining elements, whereby a full control of any desired one of the elements may be obtained with a more limited control of another element.

8. A machine tool comprising, in combination, a plurality of movable machine tool elements, power actuating means for moving said elements, a main set of manual control devices adapted to control said power actuating means for effecting a variety of operations for an associated one of said elements, an auxiliary set of manual control devices adapted to control said power actuating means for effecting a more limited variety of operations of an associated one of said elements, and selector means for associating said main and auxiliary sets of controls with different ones of said elements.

9. A machine tool comprising, in combination, a work support, a tool support, means including three machine tool elements movable in separate paths each at right angles to the other for effecting three dimensional relative movement between said supports, power actuating means for moving said elements, a main set of manual control devices adapted to control said power actuating means for effecting a variety of operations for an associated one of said elements, selector means for conditioning said main controls to govern the operation of any selected one of said three elements, and one auxiliary set of manual control devices for governing the operation of a non-selected element to accomplish simultaneous relative movement of said supports in a second direction.

10. A machine tool comprising in combination, a plurality of separately movable machine tool elements, a first power actuator operable to drive a selected one of at least two of said elements, a second power actuator means operable to drive at least one of the other of said elements, a set of manual control devices, and selector means for connecting said set of control devices in operative relation with a selected one of said power actuators and for connecting said first power actuator in driving relation with a selected one of said elements when said selector means is set to connect said control devices to said first power actuator.

11. A machine tool having, in combination, a plurality of movable machine tool elements, power driven mechanisms for actuating said elements at variably adjustable speeds, individual speed adjustors for said mechanisms, a plurality of manually operable control devices governing the operation of said mechanisms, a selector manually operable to place said devices in control of any selected one of said elements, and a common manually controllable device automatically associated by said selector with the speed adjustor for the drive mechanism of the selected machine tool element.

12. A machine tool comprising, in combination, a plurality of separately movable machine tool elements, power actuated means operable to drive a selected one of said elements, selector means for associating said power actuated means in driving relation with a selected one of said elements, and means for automatically stopping the drive of the selected element by said power actuated means in response to an actuation of said selector means to select a different element.

13. A machine tool comprising, in combination, a plurality of separately movable machine tool elements including a power rotatable cutter spindle, a plurality of power actuated mechanisms connected in driving relation with various ones of said elements, a combined emergency-stop and spindle jog control device, means responsive to a momentary actuation of said device for stopping all of said power actuated mechanisms then operating, and means responsive to a sustained actuation of said device for restarting the drive mechanism associated with said spindle and maintaining the same in operation throughout the period of actuation of said device for jogging said spindle.

14. A machine tool having, in combination, a plurality of machine tool elements movable along paths extending transversely of each other, individual power actuators for said elements, two separate groups of control devices and respectively operable to control different ones of said actuators and produce motions of corresponding ones of said elements, one of said actuators being started by and maintained in continued operation in response to momentary actuation of one device of one of said groups and the other actuator being maintained in operation only in response to sustained actuation of a device of the other group.

15. A machine tool comprising, in combination, a plurality of power actuated machine tool elements movable reversely in respective individual paths of travel, a set of manual control devices for governing the operation of an associated element and including a direction control means, selector means for connecting said set of control devices to govern the operation of any selected one of said elements, and limit control means associated with each of said elements, for automatically stopping the associated element in predetermined limit positions in its path of travel and preventing further movement thereof until said direction selector means is set for the opposite direction of element movement, said selector means being effective to condition said set of controls to effect travel of another of said elements without a change in setting of said direction control means after the one of said elements with which the controls were previously associated by said selector means has been stopped by its corresponding limit control means.

16. A machine tool having, in combination, a plurality of machine tool elements movable along different paths extending transversely of each other, power driven mechanisms for actuating said elements in opposite directions along their respective paths, a control panel located remotely from said mechanisms, a plurality of manually operable control devices grouped together on said panel and governing the operation of said mechanisms to feed, rapid traverse, stop, jog, and reverse the direction of any one of said elements, and selector mechanism on said panel manually operable to place said devices as a group in control of the power actuated mechanism for actuating any selected one of said elements.

17. A machine tool having, in combination, a plurality of machine tool elements movable along different paths extending transversely of each other, individual power driven actuators identified with the respective elements and operable to impart movements of different characters thereto, a group of manually operable control devices governing said actuators and respectively operable to cause movements of said different characters to be executed, and mechanism selectively operable to place said devices as a group in active control of any selected one of said actuators.

18. A machine tool having, in combination, a plurality of machine tool elements movable along different paths extending transversely of each other, power driven mechanisms for actuating said elements in opposite directions along their respective paths, a group of manually operable control devices respectively governing the operation of said mechanisms to feed, rapid traverse, stop, jog, and reverse the direction of any one of said elements, and selector mechanism manually operable to place said devices as a group in control of the power actuated mechanisms for any selected one of said elements.

19. A machine tool having, in combination, a plurality of power actuated machine tool elements movable along paths extending transversely of each other, a main group of control devices operable selectively to produce different motions of one of said elements, a multiple position selector for associating said devices with different ones of said elements one at a time, an auxiliary set of control devices for governing the operation of said elements, and means operable selectively by said selector to associate with said auxiliary set of devices different ones of said elements each predetermined by the condition of said selector.

20. A machine tool having, in combination, a plurality of power actuated machine tool elements movable along paths extending transversely of each other, a group of control devices operable selectively to produce motions of different character of one of said elements, a selector for associating said devices with different ones of said elements one at a time, a second set of control devices for governing the operation of said elements, and means operated automatically by said selector to associate said second set of devices with a different one of said elements.

21. A machine tool having, in combination, a plurality of power actuated machine tool elements movable along paths extending transversely of each other, two separate groups of control devices, each operable selectively to produce different motions of one of said elements, and a single mechanism operable selectively to place one set of the control devices in control of any selected one of said elements and the other set in control of a different one of the elements.

22. A machine tool having, in combination, relatively movable work and tool supports, individual power driven actuators operable to produce relative movements of said supports in different transversely extending directions, a plurality of groups of manually operable control devices, each group governing said actuators and operable to cause movements of said different characters to be executed, mechanism selectively operable to place one of said groups of said devices in active control of any selected one of said actuators, and means automatically operable by said mechanism to place said other group of devices in control of an actuator that will produce relative movement of said supports perpendicular to the actuator associated with said selected group of devices.

23. A machine tool having, in combination, a movable machine tool element, a power operator therefor, a clamp for holding said element against movement, a power actuator for applying and releasing said clamp, means including a push button device adapted when depressed momentarily to cause said actuator to apply said clamp, means including a separate push-button device adapted when depressed with said clamp applied to control said actuator and said operator to first release said clamp and then initiate movement of said element.

24. A machine tool having, in combination, a movable machine tool element, a power operator therefor, a clamp for holding said element against movement, a power actuator for applying and releasing said clamp, manually operable means controlling said actuator to apply said clamp, and means including an independently operable control device adapted, when actuated with said clamp released, to initiate immediate movement of said element by said operator and, when actuated with said clamp applied, to energize said actuator to release said clamp and thereafter energize said operator to initiate movement of said element.

25. A machine tool having, in combination, a plurality of independently movable machine tool elements, power actuators for driving said elements individually, a manually operable control device, and mechanism operable in response to sustained actuation of said device to control one of said actuators and cause jogging of one of said elements thereby and in response to momentary actuation of the device to stop all of said actuators.

26. A machine tool having, in combination, a plurality of individually movable machine tool elements, power actuators for imparting feed and rapid traverse movements to the respective elements, a plurality of manually operable devices controlling said actuators and operable selectively to cause feeding movement of any selected one of said elements by its actuator, a single manually operable member placed in control of any selected one of said actuators automatically as an incident to conditioning of such actuator for feeding of its associated element, and means operable upon actuation of said member to initiate rapid transverse operation of the actuator with which the member is then associated.

WILLIAM F. RIDGWAY.

DISCLAIMER 2,224,108.—*William F. Ridgway*, Rockford, Ill. MACHINE TOOL. Patent dated December 3, 1940. Disclaimer filed November 10, 1944, by the assignee, *The Ingersoll Milling Machine Company*.

Hereby enters this disclaimer to claims 13 and 25 of said specification.

[*Official Gazette December 5, 1944.*]